US011481421B2

(12) United States Patent
Walton et al.

(10) Patent No.: US 11,481,421 B2
(45) Date of Patent: Oct. 25, 2022

(54) METHODS AND APPARATUS FOR AUTOMATED REVIEW OF PUBLIC SAFETY INCIDENT REPORTS

(71) Applicant: Motorola Solutions, Inc., Chicago, IL (US)

(72) Inventors: Brady Walton, Centerville, UT (US); Jeffrey Oakes, West Jordan, UT (US); Zili Li, Chicago, IL (US); Chad Esplin, Mendon, UT (US); Curtis Porter, Stansbury Park, UT (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/719,275

(22) Filed: Dec. 18, 2019

(65) Prior Publication Data
US 2021/0191963 A1    Jun. 24, 2021

(51) Int. Cl.
G06F 16/34      (2019.01)
G06F 16/31      (2019.01)
G06Q 50/26      (2012.01)

(52) U.S. Cl.
CPC ............ *G06F 16/34* (2019.01); *G06F 16/328* (2019.01); *G06Q 50/26* (2013.01)

(58) Field of Classification Search
CPC ........ G06F 16/34; G06F 16/328; G06Q 50/26
USPC ...................................................... 715/200
See application file for complete search history.

(56) References Cited

U.S. PATENT DOCUMENTS

| 6,341,287 | B1 * | 1/2002 | Sziklai | .................. | G06Q 10/06 |
| 6,408,304 | B1 * | 6/2002 | Kumhyr | ................. | G06Q 10/10 |
| 6,721,782 | B1 * | 4/2004 | Fariborz | ................ | G06Q 10/10 |
| | | | | | 707/999.01 |

(Continued)

FOREIGN PATENT DOCUMENTS

| EP | 2884434 | 6/2015 |
| EP | 3494485 | 6/2019 |

OTHER PUBLICATIONS

Microsoft Computer Dictionary; May 1, 2002; Microsoft Press; Fifth Edition; pp. 216, 279-280.*

(Continued)

*Primary Examiner* — Andrew R Dyer
(74) *Attorney, Agent, or Firm* — Baker Botts L.L.P.; Michael A. Sartori

(57) ABSTRACT

A system for automated review of public safety incident reports include receiving structured incident data for an incident report from a submitting public safety officer including incident type information for the incident, receiving unstructured incident narrative text describing the incident, accessing an unstructured incident narrative feedback checking model applicable to incidents of the incident type, applying the model to the narrative text in light of supplemental information in the structured incident data or obtained from another source, identifying, by application of the model, matters in the narrative text likely to be flagged for correction by a human reviewer during a subsequent review, and providing feedback notifying the officer of the identified matters. The model may be retrained based on feedback or corrections provided by the officer in response to the notification of the identified matters or in response to requests for correction subsequently received from human reviewers.

17 Claims, 7 Drawing Sheets

(56) References Cited

U.S. PATENT DOCUMENTS

| | | | |
|---|---|---|---|
| 8,023,704 B2* | 9/2011 | Oosawa | G16H 15/00 382/128 |
| 8,090,669 B2 | 1/2012 | Shahani et al. | |
| 8,214,238 B1* | 7/2012 | Fairfield | G06Q 10/0639 705/7.11 |
| 8,224,820 B2* | 7/2012 | Sasai | G16H 70/20 707/736 |
| 8,229,658 B1* | 7/2012 | Dabell | G08G 1/0129 701/117 |
| 8,296,298 B1* | 10/2012 | Redman | G06Q 50/26 707/736 |
| 8,331,739 B1* | 12/2012 | Abdulkader | G06K 9/033 382/311 |
| 9,129,219 B1* | 9/2015 | Robertson | G06N 5/048 |
| 9,201,967 B1* | 12/2015 | Zhao | G06F 16/9535 |
| 9,535,894 B2 | 1/2017 | Carrier | |
| 9,715,668 B1* | 7/2017 | Brandt | G06Q 10/0631 |
| 9,971,809 B1* | 5/2018 | Tarsi | G06F 16/2455 |
| 10,380,246 B2* | 8/2019 | Clark | G06F 40/35 |
| 10,444,945 B1* | 10/2019 | Fehlman, II | G06F 16/34 |
| 2002/0116247 A1* | 8/2002 | Tucker | G06Q 30/06 709/224 |
| 2003/0233250 A1* | 12/2003 | Joffe | G16H 15/00 705/2 |
| 2006/0224409 A1* | 10/2006 | Leininger | G06F 16/148 705/1.1 |
| 2007/0237377 A1* | 10/2007 | Oosawa | G16H 50/70 382/128 |
| 2008/0082521 A1* | 4/2008 | Danielson | G06F 16/34 |
| 2009/0251545 A1 | 10/2009 | Shekarri et al. | |
| 2009/0276708 A1* | 11/2009 | Smith | G06Q 10/087 715/716 |
| 2009/0319295 A1* | 12/2009 | Kass-Hout | G06Q 50/22 705/2 |
| 2010/0023319 A1 | 1/2010 | Bikel et al. | |
| 2010/0145902 A1* | 6/2010 | Boyan | G06F 16/958 715/810 |
| 2010/0198858 A1* | 8/2010 | Edwards | G06Q 50/26 707/769 |
| 2011/0261067 A1* | 10/2011 | Trinko | G01C 21/3461 345/589 |
| 2012/0256745 A1* | 10/2012 | Piett | G06Q 30/02 340/540 |
| 2013/0179415 A1* | 7/2013 | Auvenshine | G06F 16/215 707/696 |
| 2013/0198196 A1* | 8/2013 | Myslinski | G06Q 30/02 707/740 |
| 2014/0058730 A1 | 2/2014 | Costa et al. | |
| 2014/0297661 A1* | 10/2014 | de Assuncao | G06Q 10/10 707/752 |
| 2015/0019912 A1 | 6/2015 | Darling et al. | |
| 2015/0317368 A1* | 11/2015 | Rhoads | G06F 16/245 705/311 |
| 2015/0324396 A1* | 11/2015 | Sheik Adam | G06Q 10/10 707/792 |
| 2015/0324459 A1* | 11/2015 | Chhichhia | G06F 16/93 706/12 |
| 2016/0036974 A1* | 2/2016 | Strom | H04W 4/90 455/404.1 |
| 2016/0092558 A1* | 3/2016 | Ago | G06F 16/328 707/737 |
| 2016/0191607 A1* | 6/2016 | Bekiares | G06F 16/45 709/217 |
| 2016/0210355 A1* | 7/2016 | Krantz, III | G06F 16/335 |
| 2016/0321563 A1* | 11/2016 | Sinha | G06N 3/008 |
| 2016/0358017 A1* | 12/2016 | Guzik | G06F 3/048 |
| 2017/0046411 A1* | 2/2017 | D'Souza | G06F 40/30 |
| 2017/0086050 A1* | 3/2017 | Kerning | H04W 4/90 |
| 2017/0098181 A1* | 4/2017 | Herman | G06N 5/003 |
| 2017/0124675 A1* | 5/2017 | Bruce | G06Q 50/26 |
| 2017/0187878 A1* | 6/2017 | Clawson | H04M 3/5116 |
| 2017/0200246 A1* | 7/2017 | Hedayati | G06Q 10/10 |
| 2017/0236229 A1* | 8/2017 | Roof | G06K 9/00577 705/345 |
| 2017/0301051 A1* | 10/2017 | Gauglitz | G06Q 50/01 |
| 2018/0004834 A1* | 1/2018 | Guzik | G06F 16/29 |
| 2018/0012323 A1* | 1/2018 | Oyenan | G06Q 50/265 |
| 2018/0025044 A1* | 1/2018 | Hostetter | B64C 39/024 707/690 |
| 2018/0059660 A1* | 3/2018 | Heatzig | G06K 9/00664 |
| 2018/0060798 A1* | 3/2018 | Stefik | G06Q 10/063116 |
| 2018/0082202 A1* | 3/2018 | Vepakomma | G06N 20/00 |
| 2018/0101599 A1* | 4/2018 | Arnold | G06F 40/274 |
| 2018/0101791 A1* | 4/2018 | Viswanathan | G06N 20/00 |
| 2018/0102051 A1* | 4/2018 | Suthar | G06Q 50/26 |
| 2018/0131898 A1* | 5/2018 | Guzik | H04N 5/91 |
| 2018/0144426 A1* | 5/2018 | Grbac | G06Q 30/0201 |
| 2018/0150034 A1* | 5/2018 | Theis | H04W 4/021 |
| 2018/0150076 A1* | 5/2018 | Shem Tov | G06Q 50/30 |
| 2018/0189913 A1* | 7/2018 | Knopp | G06N 20/00 |
| 2018/0246883 A1* | 8/2018 | Wang | G06F 40/30 |
| 2018/0315147 A1* | 11/2018 | Mendels | G06Q 50/26 |
| 2018/0322411 A1* | 11/2018 | Wang | G06F 40/20 |
| 2019/0164244 A1* | 5/2019 | Ghaffar | G06Q 30/0282 |
| 2019/0164245 A1* | 5/2019 | Takacs | G06Q 30/0205 |
| 2019/0259058 A1* | 8/2019 | Chakraborty | G06Q 30/0254 |
| 2020/0012919 A1* | 1/2020 | Bathaee | G06N 3/0427 |
| 2020/0175032 A1* | 6/2020 | Gibson | G06F 16/2365 |
| 2020/0175861 A1* | 6/2020 | Wansa | G08G 1/202 |
| 2020/0202739 A1* | 6/2020 | Williams | G09B 7/08 |
| 2020/0211031 A1* | 7/2020 | Patil | G07F 17/26 |
| 2020/0258178 A1* | 8/2020 | Keiser | G06Q 50/26 |
| 2020/0258181 A1* | 8/2020 | Song | G06Q 20/401 |
| 2020/0358729 A1* | 11/2020 | Stawiszynski | G06F 21/6245 |
| 2020/0412873 A1* | 12/2020 | Kaplita | G06Q 10/06311 |
| 2021/0064680 A1* | 3/2021 | Maheshwari | G06F 16/9535 |
| 2021/0073736 A1* | 3/2021 | Alawi | G06Q 10/06315 |

OTHER PUBLICATIONS

XML in 10 points; World Wide Web Consortium; Sep. 22, 2014; w3c.org; pp. 1-4.*

Bob DuCharme; Getting Started with XForms; Dec. 30, 2003; XML.com; pp. 1-13.*

Transmittal and PCT International Search Report with Written Opinion for International Application No. PCT/US2020/063870, dated Mar. 26, 2021, 14 pages.

International Preliminary Report on Patentability and Written Opinion for International application No. PCT/US2020/063870, 9 pages, dated Jun. 30, 2022.

* cited by examiner

NATURE  BURGLARY

OFFICER  SMITH

ENTERED ON  1/1/2019

SUBMIT — 415

410
OFFICER NARRATIVE CONTENT

ON JANUARY 1, 2019, I RESPONDED TO A BURGLARY CASE REPORTED BY JOHN DOE AT 123 MAIN STREET. I SPOKE TO MR. DOE AND HE SAID AROUND 2200 THE SUSPECT BROKE INTO HIS HOUSE AND A DIAMOND RING WAS MISSING. HE THEN SHOWED ME THE SECURITY CAMERA FOOTAGE. A MALE SUSPECT ENTERED MR. DOE'S RESIDENCE FROM THE REAR DOOR. HE SEARCHED THE DRAWERS IN THE LIVING ROOM AND TOOK A DIAMOND RING BEFORE LEAVING.

420
COMMON SUPERVISORY FEEDBACK ERRORS

MISSING SUSPECT DESCRIPTION  ✓  ✗

MISSING PROPERTY LOSS AMOUNT  ✓  ✗

METHODS AND APPARATUS FOR AUTOMATED REVIEW OF PUBLIC SAFETY INCIDENT REPORTS

BACKGROUND OF THE INVENTION

Public safety organizations typically maintain information associated with public safety incidents in respective records in a records management system. As public safety officers respond to incidents, they enter data into an incident report to be maintained by the records management system. After entering data into an incident report, a public safety officer submits the incident report to a workflow system in which one or more human reviewers, such as a supervisor, a records clerk, and/or a district attorney review the incident report and check for data integrity, accuracy, legal elements of a cause of action, and good form, among other things. If issues are found by a reviewer, the reviewer annotates the data in the incident report and returns it through the workflow system to the submitting public safety officer. The public safety officer makes corrections or additions, and then re-submits the incident report through the workflow system. In a typical public safety records management system and corresponding workflow system, it can take multiple days for an incident report to make its way through the workflow system and to be accepted as a final and complete incident report.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 4 illustrates a graphical user interface through which unstructured incident narrative feedback is provided to a public safety officer, in accordance with some embodiments.

Figure 1:
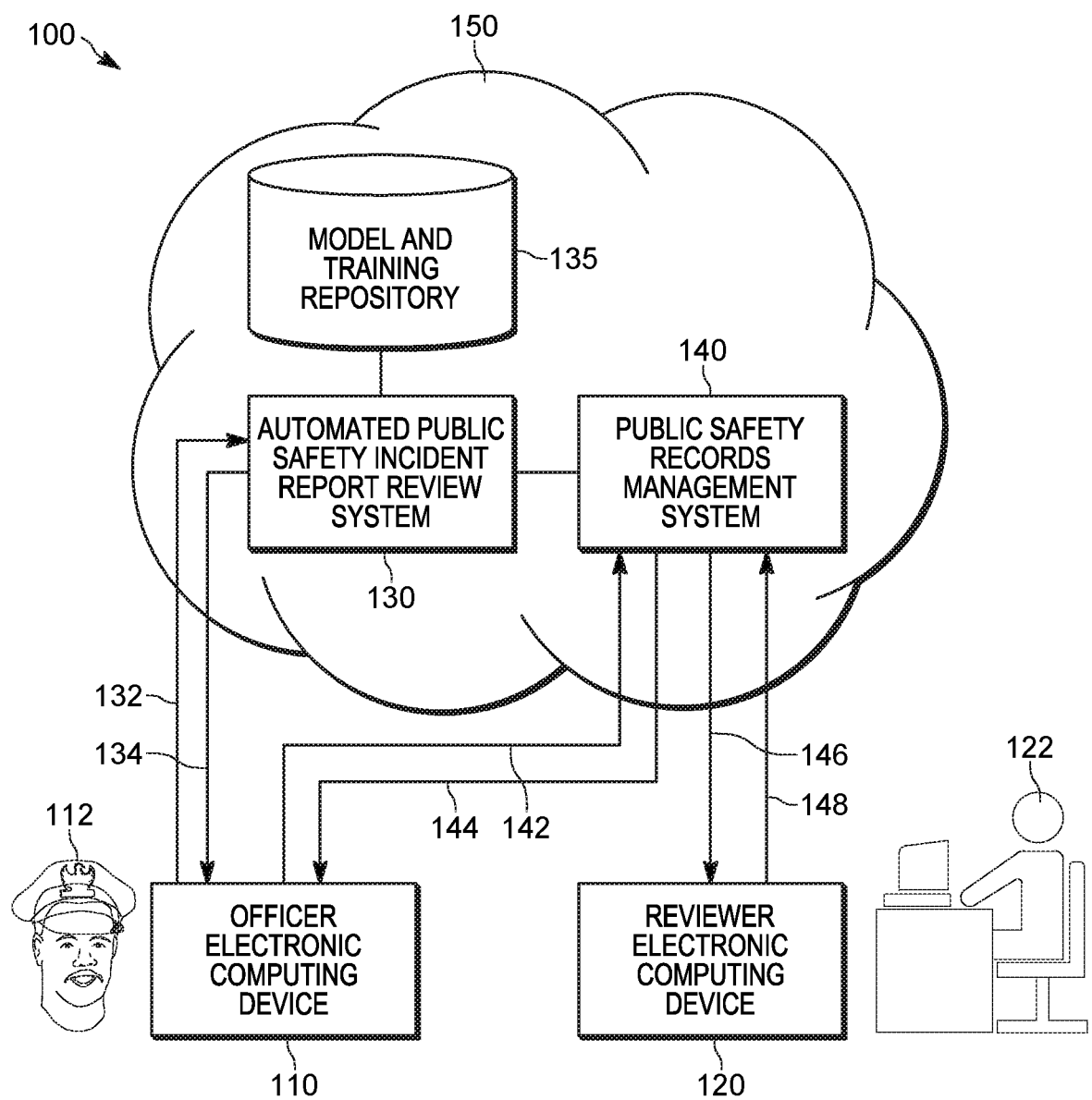
FIG. 1 is a block diagram illustrating selected elements of an example public safety incident reporting system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The devices and process components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are processes and devices for automated review of public safety incident reports. In one embodiment, a disclosed electronic computing device for automated review of public safety incident reports includes a processor and a memory storing program instructions. When executed by the processor, the program instructions are configured to receive structured incident data for a public safety incident report including incident type information identifying an incident type of a given public safety incident, receive unstructured incident narrative text describing the given public safety incident, access a first unstructured incident narrative feedback checking model applicable to public safety incident reports for public safety incidents of the identified incident type and selected from among a plurality of stored unstructured incident narrative feedback checking models, each of which is applicable to public safety incident reports for public safety incidents of one or more of a plurality of incident types, apply the first unstructured incident narrative feedback checking model to the received unstructured incident narrative text in light of supplemental information included in the received structured incident data or supplemental information associated with the given public safety incident and obtained from a source other than the received structured incident data, identify, dependent on the application of the first unstructured incident narrative feedback checking model, one or more matters in the received unstructured incident narrative text likely to be flagged for correction during a subsequent review of the received unstructured incident narrative text or the public safety incident report, and provide unstructured incident narrative feedback including notification of the one or more matters identified in the received unstructured incident narrative text to a user input/output interface of another electronic computing device from which the unstructured incident narrative text was received.

In one embodiment, a disclosed process for automated review of public safety incident reports includes receiving, via a user input/output interface of an electronic computing device, structured incident data for a public safety incident report including incident type information identifying an incident type of a given public safety incident, receiving, via the user input/output interface, unstructured incident narrative text describing the given public safety incident, retrieving a first unstructured incident narrative feedback checking model applicable to public safety incident reports for public safety incidents of the identified incident type and selected from among a plurality of available unstructured incident narrative feedback checking models each of which is applicable to public safety incident reports for public safety incidents of one or more of a plurality of incident types, applying the first unstructured incident narrative feedback checking model to the received unstructured incident narrative text in light of supplemental information included in the received structured incident data or supplemental information associated with the given public safety incident and obtained from a source other than the received structured incident data, identifying, dependent on the application of the first unstructured incident narrative feedback checking model, one or more matters in the received unstructured incident narrative text likely to be flagged for correction during a subsequent review of the received unstructured incident narrative text or the public safety incident report and providing, to the user input/output interface, unstructured incident narrative feedback including notification of the one or more matters identified in the received unstructured incident narrative text by the first unstructured incident narrative feedback checking model.

In one embodiment, a non-transitory, computer-readable storage medium having program instructions stored thereon is disclosed. When executed by an electronic processor, the program instructions cause the electronic processor to perform receiving, via a user input/output interface of an electronic computing device, structured incident data for a public safety incident report including incident type information identifying an incident type of a given public safety incident, receiving, via the user input/output interface, unstructured incident narrative text describing the given public safety incident, retrieving a first unstructured incident narrative feedback checking model applicable to public safety incident reports for public safety incidents of the identified incident type and selected from among a plurality of available unstructured incident narrative feedback checking models each of which is applicable to public safety incident reports for public safety incidents of one or more of a plurality of incident types, applying the first unstructured incident narrative feedback checking model to the received unstructured incident narrative text in light of supplemental information included in the received structured incident data or supplemental information associated with the given public safety incident and obtained from a source other than the received structured incident data, identifying, dependent on the application of the first unstructured incident narrative feedback checking model, one or more matters in the received unstructured incident narrative text likely to be flagged for correction during a subsequent review of the received unstructured incident narrative text or the public safety incident report and providing, to the user input/output interface, unstructured incident narrative feedback including notification of the one or more matters identified in the received unstructured incident narrative text by the first unstructured incident narrative feedback checking model.

In any of the disclosed embodiments, the received structured incident data may further include one or more of location information describing a location of the given public safety incident and officer information identifying a public safety officer submitting the structured incident data. The received unstructured incident narrative text may describe one or more of a timeline associated with the given public safety incident and an interaction between two or more persons involved in the given public safety incident. The supplemental information associated with the given public safety incident may be obtained from an audio file associated with the given public safety incident, a video file associated with the given public safety incident, or a textural representation of audio or video data captured in association with the given public safety incident. The plurality of incident types may include two or more of a traffic incident type, a robbery type, a burglary type, a trespass type, a resisting arrest type, an assault type, a battery type, and a homicide type.

In any of the disclosed embodiments, the one or more matters identified in the received unstructured incident narrative text by the first unstructured incident narrative feedback checking model may include one or more omissions, inclusions, or conflicts in the received unstructured incident narrative text likely to be flagged for correction during a subsequent review of the received unstructured incident narrative text or the public safety incident report.

In any of the disclosed embodiments, each of the plurality of available unstructured incident narrative feedback checking models may be applicable to public safety incident reports reviewed by a respective reviewer and the first unstructured incident narrative feedback checking model may be applicable to public safety incident reports reviewed by a given reviewer likely to review the received unstructured incident narrative text or the public safety incident report. In any of the disclosed embodiments, the given reviewer may be a supervisor of a public safety officer on whose behalf the received unstructured incident narrative text was received, a records clerk, a court clerk, or an officer of a court.

In any of the disclosed embodiments, prior to retrieving the first unstructured incident narrative feedback checking model, each of the plurality of available unstructured incident narrative feedback checking models may be trained using one or more of unstructured incident narrative text received on behalf of one or more public safety officers and corresponding unstructured incident narrative feedback submitted by one or more reviewers in association with prior public safety incidents of the identified incident type, unstructured incident narrative text received on behalf of one or more public safety officers and corresponding unstructured incident narrative feedback submitted by a given reviewer in association with a prior public safety incident of the identified incident type, unstructured incident narrative text received on behalf of one or more public safety officers and corresponding unstructured incident narrative feedback submitted by one or more reviewers in association with prior public safety incidents of multiple incident types, and unstructured incident narrative feedback submitted electronically by one or more reviewers in association with prior public safety incidents of multiple incident types.

In any of the disclosed embodiments, prior to submitting the public safety incident report for review, a revised unstructured incident narrative text may be received reflecting one or more additions to, removals from, or modifications of the received unstructured incident narrative text responsive to the notification of the one or more matters identified in the received unstructured incident narrative text by the first unstructured incident narrative feedback checking model, and the public safety incident report including the revised unstructured incident narrative text may be submitted for review.

In any of the disclosed embodiments, when executed by the processor, the program instructions may be further configured to submit the received structured incident data and the received unstructured incident narrative text to a review process, to receive, from the review process, a request to correct one or more matters in the received unstructured incident narrative text that were flagged for correction by a reviewer, to receive, on behalf of a public safety officer from whom the received unstructured incident narrative text was received, a revised unstructured incident narrative text reflecting one or more additions to, removals from, or modifications of the received unstructured incident narrative text responsive to the one or more matters in the received unstructured incident narrative text identified by the reviewer, and to provide the received unstructured incident narrative text, the request received from the review process, and the revised unstructured incident narrative text to a training repository for subsequent re-training of the first unstructured incident narrative feedback checking model.

In any of the disclosed embodiments, when executed by the processor, the program instructions may be further configured to determine whether the request received from the review process is potentially applicable to all public safety incidents of the identified incident type or is specific to the given public safety incident. Providing the received unstructured incident narrative text, the request received from the review process, and the revised unstructured incident narrative text to the training repository may be performed in response to determining that the request received from the review process is potentially applicable to all public safety incidents of the identified incident type.

In any of the disclosed embodiments, when executed by the processor, the program instructions may be further configured to receive, on behalf of a public safety officer from whom the received unstructured incident narrative text was received, an indication that the one or more matters identified in the received unstructured incident narrative text by the first unstructured incident narrative feedback checking model do not require correction, and to provide the received unstructured incident narrative text, the one or more matters identified in the received unstructured incident narrative text by the first unstructured incident narrative feedback checking model, and the indication that the one or more matters identified in the received unstructured incident narrative text by the first unstructured incident narrative feedback checking model do not require correction to a training repository for subsequent re-training of the first unstructured incident narrative feedback checking model.

In any of the disclosed embodiments, when executed by the processor, the program instructions may be further configured to identify one or more potential resolutions to the one or more matters identified in the received unstructured incident narrative text by the first unstructured incident narrative feedback checking model that meet a minimum confidence level threshold, and to provide, to the user input/output interface, the identified one or more potential resolutions. The program instructions may be further configured to receive a selection of one of the identified one or more potential resolutions, and to provide the received unstructured incident narrative text, the one or more matters identified in the received unstructured incident narrative text by the first unstructured incident narrative feedback checking model, and the selected one of the identified one or more potential resolutions to a training repository for subsequent re-training of the first unstructured incident narrative feedback checking model.

In any of the disclosed embodiments, each of the plurality of available unstructured incident narrative feedback checking models may be applicable to public safety incident reports reviewed by a respective reviewer and the first unstructured incident narrative feedback checking model may be applicable to public safety incident reports reviewed by a supervisor of a public safety officer on whose behalf the received unstructured incident narrative text was received, a records clerk, a court clerk, or an officer of a court.

As previously noted, in a typical existing workflow system for reviewing public safety incident reports, it may take several days for multiple human reviewers to review the public safety incident reports, return annotated reports to the submitting public safety officers, and re-submit corrected reports one or more times until the reports are accepted. In at least some embodiments, use of the public safety incident reporting systems described herein may reduce the number of issues found in the free-form narrative text portions of public safety incident reports during the later stages of a review process workflow. This may, in turn, relieve all involved of expenditures of excess time and unnecessary effort. In addition, by allowing submitting public safety officers to correct the free-form narrative text at a time when the incident information is fresh in the officer's mind, the accuracy of the resulting public safety incident reports may be improved compared to reports reviewed using typical existing workflow systems.

In at least some embodiments, the public safety incident reporting systems described herein may, prior to submitting public safety incident reports to a human-based review process workflow, perform automated reviews of the narrative text in the public safety incident reports using machine learning models that were built and trained based on comments, annotations, or other feedback provided when supervisors or other reviewers rejected previously submitted public safety incident reports. The machine learning models may be trained to evaluate public safety incident reports and identify common errors in free-form narratives describing public safety incidents, so that the reports can be corrected before being passed along to human reviewers involved in the review process workflow. As the public safety incident reporting systems described herein apply, and subsequently retrain, these models, public safety officers may be less likely to submit a public safety incident report to the human-based review process workflow that will be rejected based on commonly identified issues than when using typical existing workflow systems.

In some embodiments, building and training the machine learning models may include capturing annotations from supervisors and other reviewers explaining why they rejected particular public safety incident reports, and building the machine learning models based on the submitted reports, prior to any correction, and resulting reports, including any corrections made in response to reviewer annotations. More specifically, the machine learning models may be created by processing a corpus of previous public safety incident narratives for public safety incidents of each of multiple incident types handled by a particular public safety agency, including the feedback received from human reviewers during the subsequent review process workflow.

In some embodiments, the machine learning models described herein may be trained to identify, and indicate to submitting public safety officers, matters that are likely to be flagged in free-form narrative text within public safety incident reports during a subsequent human-based review process workflow, such as by describing or highlighting particular elements in the narrative text.

Referring now to FIG. 1, there is provided a block diagram illustrating selected elements of an example public safety incident reporting system 100, in accordance with some embodiments. In the illustrated example, public safety incident reporting system 100 includes, in an on-premises or cloud computing environment 150, a public safety records management system 140, an automated public safety report review system 130, and a model and training repository 135 that stores machine learning models and training data for the automated public safety report review system 130.

In the illustrated example, public safety incident reporting system 100 also includes, for a public safety officer 112, an officer electronic computing device 110 through which public safety officer 112 interacts with public safety records management system 140 and automated public safety report review system 130. In some embodiments, public safety officer 112 may enter structured incident data and unstructured incident narrative text into a public safety incident report maintained in public safety records management system 140 using a user input/output interface of officer electronic computing device 110. For example, public safety officer 112 may enter structured incident data and unstructured incident narrative text in a report previously created for a public safety incident in public safety records management system 140 through a keyboard, graphical user interface, voice input interface, or other user input mechanism of officer electronic computing device 110. In some embodiments, the public safety incident report may have originated as, or be based on, a record created in a computer aided dispatch system (not shown in FIG. 1) for a reported public safety incident. In at least some embodiments, prior to public safety officer 112 submitting the public safety incident report including the information entered by the public safety officer 112 to a review workflow managed by the public safety records management system 140, the report may be analyzed by automated public safety report review system 130.

As described in more detail below, automated public safety report review system 130 may receive the structured incident data and unstructured incident narrative text from officer electronic computing device 110, shown as inputs 132. In some embodiments, to receive the structured incident data and unstructured incident narrative text, automated public safety report review system 130 may receive a draft version of the public safety incident report in progress, including the structured incident data and unstructured incident narrative text. In response to receiving the structured incident data and unstructured incident narrative text, automated public safety report review system 130 may analyze the received unstructured incident narrative text to identify any matters in the unstructured incident narrative text likely to be flagged for correction during a subsequent review of the received unstructured incident narrative text or the public safety incident report. In at least some embodiments, automated public safety report review system 130 processes the unstructured incident narrative text using a machine learning model that is selected based on a determined incident type of the public safety incident. For example, model and training repository 135 may store multiple machine learning models, each of which is applicable to public safety incidents of one or more respective incident types. If any such matters are identified, automated public safety report review system 130 may provide unstructured incident narrative feedback, including a notification of the matters identified in the received unstructured incident narrative text, to officer electronic computing device 110, shown as feedback 134. Subsequently, automated public safety report review system 130 may receive corrections or other feedback entered by public safety officer 112 from officer electronic computing device 110 as additional inputs 132.

In at least some embodiments, a public safety report review may be performed automatically and in real time by automated public safety report review system 130 as the public safety officer 112 enters structured incident data and unstructured incident narrative text into a public safety incident report using the user input/output interface of officer electronic computing device 110. In at least some embodiments, the techniques described here may allow public safety officer 112 to correct matters that would otherwise be likely to be flagged for correction by a particular reviewer at a corresponding stage in the review workflow prior to the incident report being submitted to the particular reviewer. This may result in more complete public safety incident reports and fewer iterations between stages in the review workflow prior to completion of the report which, in turn, may lead to a decrease in cycle time and increase in the quality of public safety incident reports, and lower bandwidth consumption in the system 100, compute power, and storage requirements due to fewer back-and-forth review cycles.

In the illustrated example, public safety incident reporting system 100 also includes, for a given reviewer 122, a reviewer electronic computing device 120 through which the given reviewer interacts with public safety records management system 140. For example, public safety officer 112 may submit the public safety incident report, which might or might not include corrections made in response to feedback received from automated public safety report review system 130, to public safety records management system 140 for review, shown as report submission 142. The public safety incident report may then move through a review process workflow including multiple review stages. At each review stage, a corresponding reviewer 122 may access the structured incident data and unstructured incident narrative text from public safety records management system 140, shown as narrative review 146. For example, reviewer 122 may review unstructured incident narrative text entered by public safety officer 112 in a record created for a public safety incident in public safety records management system 140 or in a computer aided dispatch system (not shown in FIG. 1). The given reviewer 122 may accept the public safety incident report to be passed to the next review stage or annotate the unstructured incident narrative text in the public safety incident report and reject the report, returning it to public safety records management system 140 for potential correction by public safety officer 112. In some embodiments, the reviewer 122 may accept, annotate, or reject the public safety incident report through a keyboard, graphical user interface, voice input interface, or other user input mechanism of reviewer electronic computing device 120. For example, reviewer 122 may enter a request for correction to public safety records management system 140, shown as request submission 148. Officer electronic computing device 110 may receive the request for correction, shown as request 144, on behalf of public safety officer 112.

In various embodiments, officer electronic computing device 110 and reviewer electronic device 120 may interact with public safety records management system 140 and automated public safety report review system 130 over one or more wired or wireless public safety networks. In some embodiments, one or more of a public safety records management system 140, automated public safety report review system 130, and model and training repository 135 may reside on a local or remote server that is communicatively coupled to officer electronic computing device 110 and reviewer electronic device 120, rather than in a cloud computing environment 150. In other embodiments, the functionality implementing automated public safety incident report review may be partitioned between various elements of public safety incident reporting system 100 differently than as depicted in FIG. 1 and described above. For example, some or all of the functionality of automated public safety report review system 130 may be implemented within a public safety records management system, rather than in a separate system.

Figure 2:
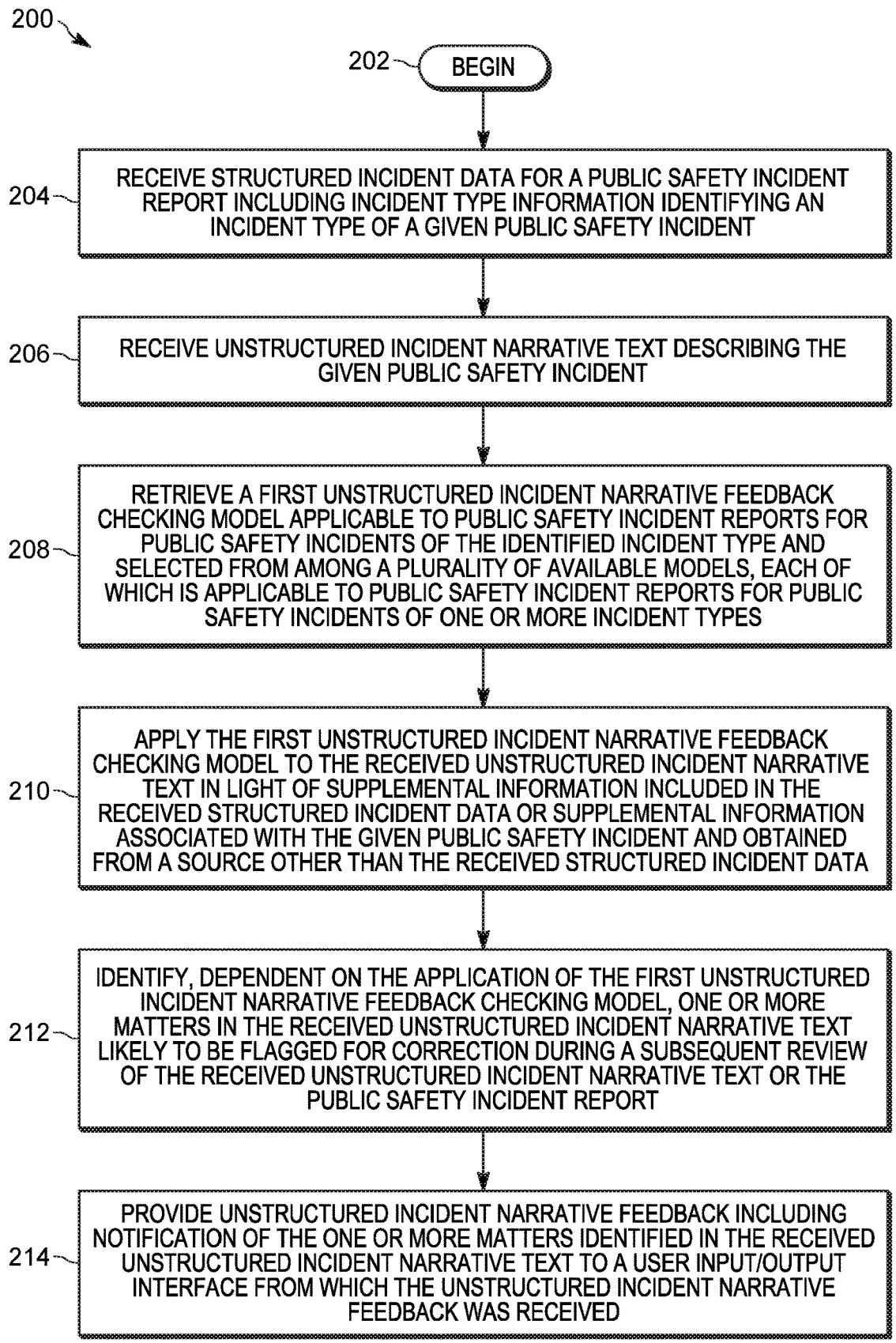
FIG. 2 is a flowchart illustrating selected elements of an example process for automated review of public safety incident reports, in accordance with some embodiments.

FIG. 2 is a flowchart illustrating selected elements of an example process 200 for automated review of public safety incident reports, in accordance with some embodiments. In at least some embodiments, some or all of the operations shown in FIG. 2 may be performed by an automated public safety incident report review system, such as automated public safety incident report review system 130 illustrated in FIG. 1. In at least some embodiments, the automated public safety incident report review system 130 may include a processor and a memory storing instructions that when executed by the processor cause the processor to perform one or more of the operations illustrated in FIG. 2. In other embodiments, automated public safety incident report review system 130 may include a hardware state machine or other electronic circuitry configured to perform one or more of the operations illustrated in FIG. 2. While a particular order of operations is indicated in FIG. 2 for illustrative purposes, the timing and ordering of such operations may vary where appropriate without negating the purpose and advantages of the examples set forth in detail throughout the remainder of this disclosure.

In this example embodiment, process 200 begins at block 202 in FIG. 2 and continues at block 204 with receiving structured incident data for a public safety incident report including incident type information identifying an incident type of a given public safety incident. For example, the structured incident data may be received via a user interface of an electronic communication device on behalf of a public safety officer submitting a public safety incident report that includes the structured incident data, such as in individually tagged text fields in a graphical user interface or electronic document. In various embodiments, the public safety incident types for which incident-specific automated review of public safety incident reports is supported may include, but are not limited to, a traffic incident type, a robbery type, a burglary type, a trespass type, a resisting arrest type, an assault type, a battery type, and a homicide type. In at least some embodiments, the received structured incident data may include one or more of location information describing a location of the public safety incident and officer information identifying a public safety officer submitting the structured incident data.

At 206, process 200 includes receiving unstructured incident narrative text describing the given public safety incident. For example, the unstructured incident narrative text may be received via a user interface of an electronic communication device on behalf of the public safety officer submitting the public safety incident report, including the unstructured incident narrative text. The unstructured incident narrative text may be entered in a freeform text field in a graphical user interface or electronic document, in some embodiments. In at least some embodiments, the received unstructured incident narrative text may describe one or more of a timeline associated with the given public safety incident and an interaction between two or more persons (including public safety officers and/or civilians) and/or objects involved in the given public safety incident.

At 208, process 200 includes retrieving a first unstructured incident narrative feedback checking model applicable to public safety incident reports for public safety incidents of the identified incident type. The first unstructured incident narrative feedback checking model may be a machine learning model selected from among a plurality of available machine learning models for the automated public safety incident report review system, each of which is applicable to public safety incident reports for public safety incidents of one or more incident types.

At 210, the process includes applying the first unstructured incident narrative feedback checking model to the received unstructured incident narrative text in light of supplemental information included in the received structured incident data or supplemental information associated with the given public safety incident and obtained from a source other than the received structured incident data. As noted above, in some embodiments, applying the first unstructured incident narrative feedback checking model to the received unstructured incident narrative text may be performed as the public safety officer is filling out the public safety incident report shortly after the incident rather than during the incident or at a much later time. The first unstructured incident narrative feedback checking model may incorporate knowledge about the types of public safety incident report elements that should be reflected in the unstructured incident narrative text, with different machine learning models being generated for respective incident types. For example, a public safety incident report for a burglary may be expected to include a mention of a stolen item and a description or name of a victim in the unstructured incident narrative text. For other property crimes, the unstructured incident narrative text may be expected to include a description of the property. For other victim crimes, the unstructured incident narrative text may be expected to include the names of the victims. In at least some embodiments, application of the first unstructured incident narrative feedback checking model may ensure that all persons, vehicles, involved weapons, or other important entities associated with the structured data, such as in various individually tagged text fields, are referenced in the unstructured incident narrative text.

In some embodiments, the first unstructured incident narrative feedback checking model may also consider supplemental information associated with the given public safety incident to identify matters that are likely to be flagged for correction during a subsequent review. The supplemental information may, for example, include an audio file associated with the given public safety incident, a video file associated with the given public safety incident, or a textural representation of audio or video data captured in association with the given public safety incident, such as a transcription of an audio or video file or a portion thereof. The supplemental information may be obtained, for example, from a body worn camera, an in-car camera, a surveillance camera, or another type of image capture device or audio capture device. In some embodiments, the supplemental information may include a description of a person or object identified in an audio data file or video data file through voice recognition, facial recognition or object recognition, for example.

At 212, process 200 includes identifying, dependent on the application of the first unstructured incident narrative feedback checking model, one or more matters in the received unstructured incident narrative text likely to be flagged for correction during a subsequent review of the received unstructured incident narrative text or the public safety incident report. In various embodiments, the one or more matters identified in the received unstructured incident narrative text by the first unstructured incident narrative feedback checking model may include one or more omissions, inclusions, or conflicts in the received unstructured incident narrative text likely to be flagged for correction during a subsequent review of the received unstructured incident narrative text or the public safety incident report. For example, an identified matter may include a person, vehicle, involved weapon, or other important entity associated with the structured incident data, such as in various individually tagged text fields, that is not referenced in the unstructured incident narrative text or that is described in the unstructured incident narrative text in a way that contradicts the structured incident data. In some embodiments, an identified matter may represent the omission of an occurrence time associated with the public safety incident or the inclusion of a restricted informant or under cover officer's name.

In some embodiments, an identified matter may represent an identified discrepancy or contradictory information in the unstructured incident narrative text when compared to supplemental information associated with the given public safety incident and obtained from a source other than the received structured incident data, such as supplemental information captured from an audio recording or video footage, or transcriptions thereof, or obtained from an unstructured incident narrative text received from another public safety officer. For example, if video footage is available from a body worn camera and the dialogue includes certain elements, but the unstructured incident narrative text describes those elements differently, contradicting what is depicted in the video or described in the dialogue this may be identified as a matter likely to be flagged for correction during a subsequent review process.

In at least some embodiments, by the time the public safety officer begins filling out the public safety incident report, including the structured incident data and unstructured incident narrative text, an audio recording or video footage associated with the public safety incident may be available for consideration by the first unstructured incident narrative feedback checking model, such that, from the perspective of the public safety officer submitting the report, any unstructured incident narrative feedback that takes the audio recording or video footage into consideration may be received in real time. In other embodiments, there might not be an audio recording, video footage, or other supplemental information associated with the public safety incident available at the time the public safety officer is filling out the public safety incident report. In such embodiments, the first unstructured incident narrative feedback checking model may automatically reanalyze the unstructured incident narrative text once supplemental information becomes available and may provide unstructured incident narrative feedback to the public safety officer at that time.

In some embodiments, and for particular types of public safety incidents, an identified matter may represent a conflict between elements of a cause of action and defenses to a cause of action for the public safety incident. For example, for a given public safety incident type, there may be certain elements of a cause of action that the prosecution will have to prove and there may be available defenses to that cause of action. In some embodiments, the techniques described herein may be used to detect a conflict or discrepancy between elements of the cause of action and an available defense in the unstructured incident narrative text. In one example, if a public safety officer pulls a car over for a traffic stop, a potential defense to the cause of action would be that the public safety officer believed the driver had run a red light. However, if the unstructured incident narrative text states that the public safety officer pulled the car over because they believed the driver had run a red light, but video footage captured at the scene indicates that there was a different reason that the public safety officer pulled the car over, this may be identified as a matter likely to be flagged for correction during a subsequent review process.

At 214, process 200 includes providing unstructured incident narrative feedback including a notification of the one or more matters identified in the received unstructured incident narrative text to a user input/output interface from which the unstructured incident narrative feedback was received. In at least some embodiments, the unstructured incident narrative feedback may be provided to a user input/output interface of an electronic computing device associated with the public safety officer submitting the public safety incident report, including the unstructured incident narrative text. In various embodiments, the notification may be provided to the public safety officer submitting the public safety incident report as an annotation of the unstructured incident narrative text itself, as comments presented in a separate user narrative feedback interface element of the user input/output interface, or through the highlighting of particular words or phrases in the unstructured incident narrative text associated with the identified matters.

Figure 3:
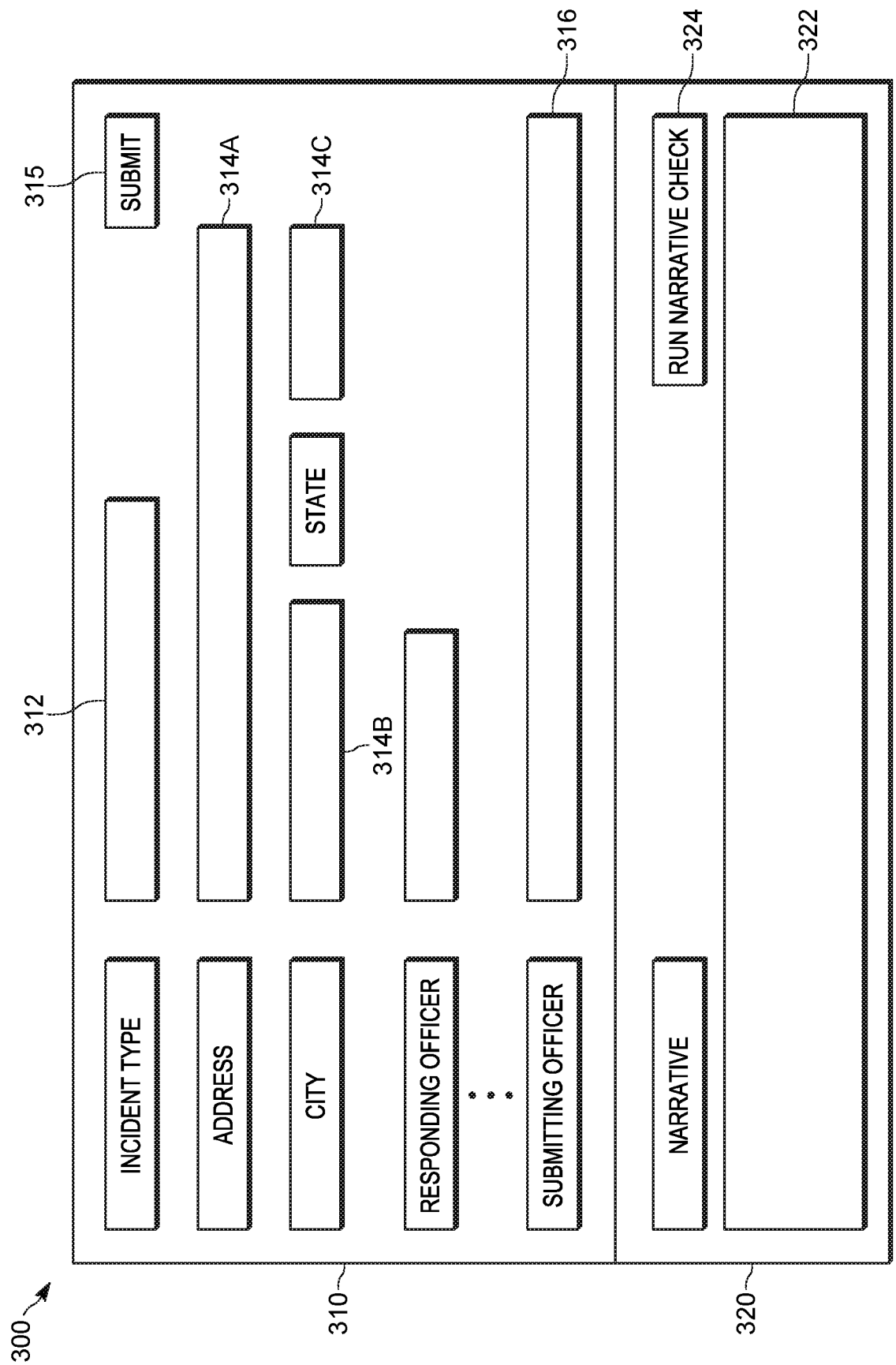
FIG. 3 illustrates a graphical user interface through which a public safety officer enters structured incident data and unstructured incident narrative text, in accordance with some embodiments

FIG. 3 illustrates a graphical user interface 300 through which a public safety officer may enter structured incident data and unstructured incident narrative text, in accordance with some embodiments. In the illustrated example, graphical user interface 300 includes a structured incident data portion 310, into which structured incident data is to be entered in various individually tagged text fields. The structured incident data portion 310 includes tagged text fields into which incident type information 312, location information 314a through 314c, and officer information 316 identifying the submitting public safety officer are to be entered. In some embodiments, there may be predefined rules identifying which of the tagged text fields represent required information. These rules may be hard-coded for one or more public safety incident types or may be configurable for particular public safety incident types, in different embodiments. In the illustrated embodiment, the structured incident data portion 310 also includes a user interface element 315 that is selectable to submit the public safety incident report to a review process workflow.

In the illustrated example, graphical user interface 300 also includes unstructured incident narrative text portion 320, including unstructured incident narrative text box 322 and a user interface element 324, labeled as "run narrative check," that is selectable to initiate an automated review of the unstructured incident narrative text entered in unstructured incident narrative text box 322, as described herein. In embodiments in which the automated public safety incident report review system applies specific unstructured incident narrative feedback checking models to public safety incident reports of particular public safety incident types, the automated public safety incident report review system may select an unstructured incident narrative feedback checking model based on the incident type information entered in text field 312.

In the illustrated embodiment, the submitting public safety officer may initiate an automated review of the unstructured incident narrative text entered in unstructured incident narrative text box 322 at any time prior to submitting the report to the review process workflow, including while drafting the public safety incident report, by selecting user interface element 324. In other embodiments, an automated review of the unstructured incident narrative text entered in unstructured incident narrative text box 322 may be initiated in response to selection of user interface element 315. For example, if and when the submitting public safety officer selects user interface element 315, rather than immediately submitting the public safety incident report to the review process workflow, the automated public safety incident report review system may apply an appropriate unstructured incident narrative feedback checking model to analyze the unstructured incident narrative text. If any matters are identified as likely to be flagged for correction during the review process workflow, the automated public safety incident report review system may provide unstructured incident narrative feedback to the public safety officer and may decline to submit the public safety incident report to the review process workflow until corrections or other feedback is received from the public safety officer. On the other hand, if no matters are identified as likely to be flagged for correction during the review process workflow, the automated public safety incident report review system may pass the public safety incident report to the review process workflow.

In other embodiments, more, fewer, or different user interface elements may be included in a graphical user interface through which a public safety officer enters structured incident data and unstructured incident narrative text or the user interface elements of graphical user interface 300 shown in FIG. 3 may be arranged or partitioned differently than the way they are arranged and partitioned in the illustrated example.

In at least some embodiments, the unstructured incident narrative feedback checking model applied to the public safety incident report to analyze the unstructured incident narrative text may be retrained and improved based on corrections or other feedback received from the public safety officer, as well as by requests for correction submitted by one or more human reviewers, and responses thereto, as part of the review process workflow. For example, if the public safety officer determines that an identified matter does not actually require correction, or if the public safety officer is unable to provide additional information identified as missing in the unstructured incident narrative text, this feedback may be used to improve the automated review of unstructured incident narrative text as well as the accuracy of the results generated by the automated review. If the public safety officer provides a correction to the unstructured incident narrative text to address a matter identified by the unstructured incident narrative feedback checking model that does, in fact, require correction, the provided correction may also be used to improve the automated review of unstructured incident narrative text as well as the accuracy of the results generated by the automated review.

FIG. 4 illustrates a graphical user interface 400 through which unstructured incident narrative feedback is provided to a public safety officer, in accordance with some embodiments. In some embodiments, graphical user interface 400 may be presented to the submitting public safety officer in response to the identification, by the automated review of unstructured incident narrative text, of one or more matters likely to be flagged for correction by a subsequent reviewer. The automated review may have been performed following the selection of user interface element 324 or user interface element 315 shown in graphical user interface 400 by the submitting public safety officer, among other possibilities.

In the illustrated embodiment, graphical user interface 400 includes narrative review portion 410, which displays the unstructured incident narrative text entered by the submitting public safety officer, and incident information portion 405, which in this example includes selected structured incident information such as incident type information, officer information, and a report submission date. In this example, incident information portion 405 also includes a user interface element 415 that is selectable to submit the public safety incident report, with or without corrections, to the review process workflow. Graphical user interface 400 also includes narrative feedback portion 420, which list two matters identified by the automated review of the unstructured incident narrative text displayed in narrative review portion 410 as likely to be flagged by a subsequent review process. In other embodiments, providing unstructured incident narrative feedback may include highlighting one or more elements of the unstructured incident narrative text, such as particular words or phrases in the unstructured incident narrative text associated with the identified matters, rather than, or in addition to, describing the identified matter as a missing, incomplete, extraneous, or conflicting element in narrative feedback portion 420 of graphical user interface 400.

In various embodiments, the submitting public safety officer may have multiple options for responding to unstructured incident narrative feedback resulting from the automated review of the unstructured incident narrative text. For example, in narrative feedback portion 420 of graphical user interface 400, each identified matter is followed by two selectable elements, shown as a check mark and an "X." In some embodiments, if the unstructured incident narrative feedback is valid, the submitting public safety officer may revise the unstructured incident narrative text shown in narrative review portion 410 to address the identified matter and may select the check mark to indicate that the unstructured incident narrative feedback is valid and has been addressed. The revised unstructured incident narrative text may reflect one or more additions to, removals from, or modifications of the unstructured incident narrative text.

In some embodiments, the submitting public safety officer may select the "X" if the identified matter does not require correction. In one example, the unstructured incident narrative feedback might not be valid for public safety incidents of the indicated incident type. In another example, the unstructured incident narrative feedback may generally be valid for public safety incidents of the indicated incident type but might not be relevant or important to correct for the specific public safety incident for which the public safety officer is submitting a public safety report. In other embodiments, if the unstructured incident narrative feedback is valid, but the submitting public safety officer is not able to address the feedback, the submitting public safety officer may select the check mark, or a third user interface element not shown in FIG. 4, to indicate that the unstructured incident narrative feedback is valid but is not capable of being addressed. In one example, there may be no additional information available with which to correct an identified matter at the time the submitting public officer is filling out the report. In another example, there may be no reasonable expectation that additional information with which to correct an identified matter, such as an additional audio recording, video footage, or public safety officer statement, will become available at a later time for the subject public safety incident.

In at least some embodiments, once the submitting public safety officer has provided corrections or feedback in the form of user interface element selections, the submitting public safety officer may select user interface element 415 to submit the public safety incident report, with or without corrections, to the review process workflow. Any or all of the received unstructured incident narrative text, the identified matters, the resulting unstructured incident narrative text including any corrections, and any public safety officer feedback in the form of user interface element selections may be provided to a model and training repository for the automated public safety incident report review system, such as repository 135 illustrated in FIG. 1, for retraining and improving one or more of the unstructured incident narrative feedback checking models.

In other embodiments, more, fewer, or different user interface elements may be included in a graphical user interface through which a public safety officer enters structured incident data and unstructured incident narrative text or the user interface elements of graphical user interface 400 shown in FIG. 4 may be arranged or partitioned differently than the way they are arranged and partitioned in the illustrated example.

In at least some embodiments, the review process workflow to which public safety incident reports are submitted may involve multiple human reviewers at respective stages in the review process workflow. The reviewers may include, for example, a supervisor of the public safety officer that submitted the public incident report or on whose behalf the public safety incident report, including the received unstructured incident narrative text, was received, a records clerk, a court clerk, and/or an officer of a court, such as a prosecutor. In some embodiments, each of the reviewers may be able to review a submitted public safety report and either accept the report, passing it to the next stage in the review process workflow, if any, or reject the report, sending it back to the submitting public safety officer for correction. In addition, each of the reviewers may be able to provide a request to correct the unstructured incident narrative text to the submitting public safety officer as unstructured incident narrative feedback. The unstructured incident narrative feedback may be provided in the form of highlighting, annotations, or comments within the report or using a different notification mechanism, such as an email or a notification posted for the submitting public safety officer within a public safety records management system.

The submitting public safety officer may respond to a reviewer's request to correct the unstructured incident narrative text by revising the unstructured incident narrative text, by providing feedback indicating whether or not the request was valid, or by providing feedback indicating why the requested correction was not made. The feedback may indicate, for example, that the request was not valid for public safety incidents of the indicated type or for the specific public safety incident that is the subject of the public safety report, that no additional information is currently available with which to correct an identified matter, or that there is no reasonable expectation that additional information with which to correct an identified matter will become available at a later time.

In some embodiments, not all of the reviewers may be able to accept or reject a public safety incident report. In one example, a review process workflow may include, following an automated review of the unstructured incident narrative text as described herein, a supervisor review and a records clerk review, after which the report including the unstructured incident narrative text, with or without corrections, may be released to a prosecutor. In this example, the supervisor and the records clerk may be able to accept or reject a submitted public safety incident, but the prosecutor may not. However, all three reviewers may be able to provide unstructured incident narrative feedback that can be used to retrain and improve one or more unstructured incident narrative feedback checking models to which the feedback is applicable. In some embodiments, unstructured incident narrative feedback provided by the supervisor and the records clerk may be provided to the submitting public safety officer for potential correction, but feedback provided by the prosecutor might not be provided to the public safety office.

In a review process workflow involving multiple human reviewers, each reviewer may evaluate a submitted public safety incident report, including the unstructured incident narrative text included in the report, using different criteria. For example, a supervisor may evaluate the unstructured incident narrative text to determine whether certain elements of a crime are correctly reflected in the narrative. The supervisor may flag certain matters for correction and provide a request for correction to the submitting public safety officer. A records clerk may evaluate the unstructured incident narrative text to determine whether there are defects in the unstructured incident narrative text in terms of grammar, workflow elements, or administrative elements that might be missing or that might conflict with other information in the public safety incident report or in the review history for the public safety incident report. The records clerk may flag certain matters for correction and provide a request for correction to the submitting public safety officer.

In at least some embodiments, any requests for correction provided to the submitting public safety officer by the supervisor or the records clerk, along with any corrections or other feedback provided by the submitting public safety officer in response to the requests for correction, may also be provided to a model and training repository for the automated public safety incident report review system, such as repository 135 illustrated in FIG. 1, for retraining and improving one or more of the unstructured incident narrative feedback checking models. In at least some embodiments, unstructured incident narrative feedback checking models of the automated public safety incident report review systems described herein may be trained to identify matters similar to those flagged by supervisors or records clerks, and validated by submitting public safety officers, in public safety incident reports for public safety incidents of one or more incident types so that, if identified by one of the unstructured incident narrative feedback checking models during an automated review of unstructured incident narrative text, they can be corrected by the submitting public safety officer before they are submitted to the supervisor or the records clerk during the review process workflow.

In some embodiments, a prosecutor, such as an attorney or other employee in a district attorney's office, may review the unstructured incident narrative text in a public safety incident report and provide feedback that a criminal case was lost because of certain missing or conflicting information in the unstructured incident narrative text included in a public safety incident report associated with the criminal case. In at least some embodiments, feedback provided by a prosecutor may be provided to a model and training repository for the automated public safety incident report review system for retraining and improving one or more of the unstructured incident narrative feedback checking models to which the feedback is applicable. In some embodiments, a prosecutor review may be performed well after the public safety incident report has been accepted by all of the reviewers with the ability to accept or reject the report, rather than as part of the process to accept the report. In some embodiments, the unstructured incident narrative feedback checking models may be trained or retrained with electronically received criminal prosecution court decisions instead of, or in addition to with including unstructured incident narrative feedback provided directly by a prosecutor as part of the review process workflow.

In other embodiments, the review process workflow to which public safety incident reports are submitted may involve a different number of human reviewers at respective stages in the review process workflow, each of which may evaluate a submitted public safety incident report, including the unstructured incident narrative text included in the report, using different criteria. In some embodiments, a submitting public safety officer, a supervisor, or an administrator of the automated public safety incident report review system may choose, through a user input/output interface, a particular review process workflow to be applied when reviewing a particular public safety incident. For example, the submitting public safety officer, supervisor, or administrator may be able to select a review process workflow that includes only a supervisor review, a supervisor review and a records clerk review, or a supervisor review, a records clerk review, and a prosecutor review.

In some embodiments, the automated public safety incident report review systems described herein may be configured to identify one or more potential resolutions to matters identified in unstructured incident narrative text by an unstructured incident narrative feedback checking model that meet a minimum confidence level threshold and to provide an indication or description of the potential resolutions to the submitting public safety officer via a user input/output interface. For example, when providing feedback including a notification of a matter identified as an omission, discrepancy, or other erratum likely to be flagged for correction to the public safety officer, the feedback may also include suggestions of one or more potential resolutions for addressing the identified matter (not shown in FIG. 4). The suggestions may reference the structured incident data or supplemental information associated with the public safety incident and obtained from a source other than the structured incident data that led to the identification of the matter as likely to be flagged for correction. For example, the feedback may identify content in the structured incident data, in an audio recording, in video footage, in a transcription of an audio recording or video footage that is not included, or not correctly reflected, in the unstructured incident narrative text and a suggestion to include or correct the unstructured incident narrative text to reflect the identified content in the structured incident data or supplemental information. In some embodiments, the feedback may identify supplemental information obtained from a public safety incident database, such as the name of a person who appears to be depicted in video footage and for which information is included in the database based on the automatic application of facial recognition to the video footage. In this case, the feedback may include a suggestion to include the name obtained from the database in the unstructured incident narrative feedback as a potential person of interest.

In some embodiments, potential resolutions to the identified matter may be evaluated and a respective confidence value may be assigned to each potential resolution representing the likelihood that the resolution will, in fact, correct or otherwise address the identified matter. Potential resolutions assigned a confidence value that meets or exceeds a minimum confidence threshold, such as a seventy-five percent confidence level or a ninety percent confidence level, may be presented to the submitting public safety officer for consideration.

In some embodiments in which feedback including suggestions of one or more potential resolutions for addressing the identified matter is presented to the submitting public safety officer in a graphical user interface, the graphical user interface may also include user interface elements to select one of the potential solutions or to decline all of potential resolution (not shown in FIG. 4). For example, a respective check box for each of the potential resolutions may be selected to accept the resolution or to otherwise indicate that the potential resolution would, in fact, correct or address the identified matter. In another example, a respective "X" element for each of the potential resolutions may be selected may be selected to decline the resolution or to otherwise indicate that the resolution would not, in fact, correct or address the identified matter. In some embodiments, a single "X" element may be selected to decline all of the potential resolutions or otherwise indicate that none of the potential resolutions would correct or address the identified matter. In some embodiments, if a potential resolution is accepted, the automated public safety incident report review system may be configured to automatically apply the accepted resolution to the unstructured incident narrative text. In other embodiments, the submitting public safety officer may be responsible for revising the unstructured incident narrative text to apply the accepted resolution. In at least some embodiments, the received unstructured incident narrative text, a matter identified by the automated public safety incident report review system as likely to be flagged for correction, one or more potential resolutions provided by the automated public safety incident report review system, information indicating whether each potential resolution was accepted or declined, and the resulting unstructured incident narrative text, whether revised or not, may be provided to a model and training repository for the automated public safety incident report review system for retraining and improving one or more unstructured incident narrative feedback checking models of the automated public safety incident report review system.

In some embodiments, a submitting public safety officer may decline to address a matter identified as likely to be flagged for correction in unstructured incident narrative feedback provided by the automated public safety incident report review system and this response by the submitting public safety officer may be provided to the model and training repository for retraining and improving one or more unstructured incident narrative feedback checking models of the automated public safety incident report review system. If, however, a human reviewer subsequently requests correction of the same matter identified in the unstructured incident narrative feedback provided by the automated public safety incident report review system, the fact that the same matter was, in fact, flagged for correction during the review process workflow may further inform the applicable unstructured incident narrative feedback checking models resulting in the feedback provided by the submitting public safety officer to be disregarded.

In at least some embodiments, prior to analyzing unstructured incident narrative text received from a submitting public safety officer, one or more unstructured incident narrative feedback checking models may be trained to perform automated reviews of unstructured incident narrative text using unstructured incident narrative texts and corresponding reviewer feedback associated with prior public safety incidents of various incident types. For example, in some embodiments, prior to retrieving an unstructured incident narrative feedback checking model to be applied to the unstructured incident narrative text included in a particular public safety incident report, a plurality of available unstructured incident narrative feedback checking models may be trained using one or more of unstructured incident narrative text received on behalf of one or more public safety officers and corresponding unstructured incident narrative feedback submitted by one or more reviewers in association with prior public safety incidents of a particular incident type, unstructured incident narrative text received on behalf of one or more public safety officers and corresponding unstructured incident narrative feedback submitted by a given reviewer in association with a prior public safety incident of the particular incident type, unstructured incident narrative text received on behalf of one or more public safety officers and corresponding unstructured incident narrative feedback submitted by one or more reviewers in association with prior public safety incidents of multiple incident types, and unstructured incident narrative feedback submitted electronically by one or more reviewers in association with prior public safety incidents of multiple incident types, any or all of which may have been stored, temporarily or permanently, in a model and training repository for the automated public safety incident report review system, such as repository 135 illustrated in FIG. 1.

In some embodiments, one or more unstructured incident narrative feedback checking models may be retrained and refined for improved accuracy following the acceptance of a public safety incident report at a final stage of the review process workflow, such as following acceptance of the public safety incident report by a records clerk. In other embodiments, an unstructured incident narrative feedback checking model may be retrained and refined for improved accuracy periodically or continuously in response to additional information being provided to a model and training repository for the automated public safety incident report review system, as described herein.

In some embodiments, an automated public safety incident report review system may be configured to determine whether or not unstructured incident narrative feedback received from a human reviewer as part of the review process workflow is specific to a particular public safety incident or public safety incident type, or can be generalized for application to other public safety incidents of the same incident type or to public safety incidents of multiple incident types. The determination may incorporate both aggregate unstructured incident narrative feedback received from multiple reviewers at each stage of the review process workflow and individual feedback received from reviewers that are likely to review public safety incident reports submitted by a particular public safety officer, such as a supervisor of the submitting public safety officer, such that particular requirements of the supervisor of the submitting public safety officer can be identified and potentially considered for generalization.

If it is determined that the unstructured incident narrative feedback received is generalizable to public safety incidents of the same incident type or to public safety incidents of multiple incident types, the automated public safety incident report review system may be configured to retrain the applicable unstructured incident narrative feedback checking models accordingly. For example, the automated public safety incident report review system may analyze unstructured incident narrative texts associated with public safety incidents of different types and corresponding unstructured incident narrative feedback received from multiple reviewers that have been provided to the model and training repository to determine if the unstructured incident narrative feedback is specific to the particular public safety incident or can be generalized to public safety incidents of the same incident type or to public safety incidents of multiple incident types. If similar identified matters and corresponding responses to those similar identified matters are found to be common across different public safety incidents of the same incident type or multiple incident types or across public safety incident reports reviewed by the same reviewer or multiple reviewers, the unstructured incident narrative feedback may be generalizable to different incidents or incident types, or to public safety incident reports reviewed by different reviewers. Following this determination, only the unstructured incident narrative feedback determined to be generalizable will be included in the training information used for further improving the applicable unstructured incident narrative feedback checking models.

In one example, in response to determining that a particular request for correction received during the review process workflow is potentially applicable to all public safety incidents of the identified incident type, the received unstructured incident narrative text, the request for correction received from the review process, and the revised unstructured incident narrative text may be provided to the model and training repository and used to retrain and refine all unstructured incident narrative feedback checking models applicable to the identified incident type for improved accuracy. In this case, one or more of the unstructured incident narrative feedback checking models may be incident-type-specific In another example, in response to determining that a particular request for correction received from a given reviewer during the review process workflow is potentially applicable to all public safety incidents of one or more incident types and that are reviewed by the given reviewer, the received unstructured incident narrative text, the request for correction received from the review process, and the revised unstructured incident narrative text may be provided to the model and training repository and used to retrain and refine all unstructured incident narrative feedback checking models applicable to public safety incidents of the one or more incident types that are likely to be reviewed by the given incident type for improved accuracy. In this case, one or more of the unstructured incident narrative feedback checking models may be reviewer-specific instead of, or in addition to, being incident-type-specific. In this example, an unstructured incident narrative feedback checking model may be selected for automated review of unstructured incident narrative text included in a particular public safety incident report based, at least in part, on the likelihood that the particular public safety incident report will be reviewed by a particular reviewer as part of the review process workflow.

Figure 5:
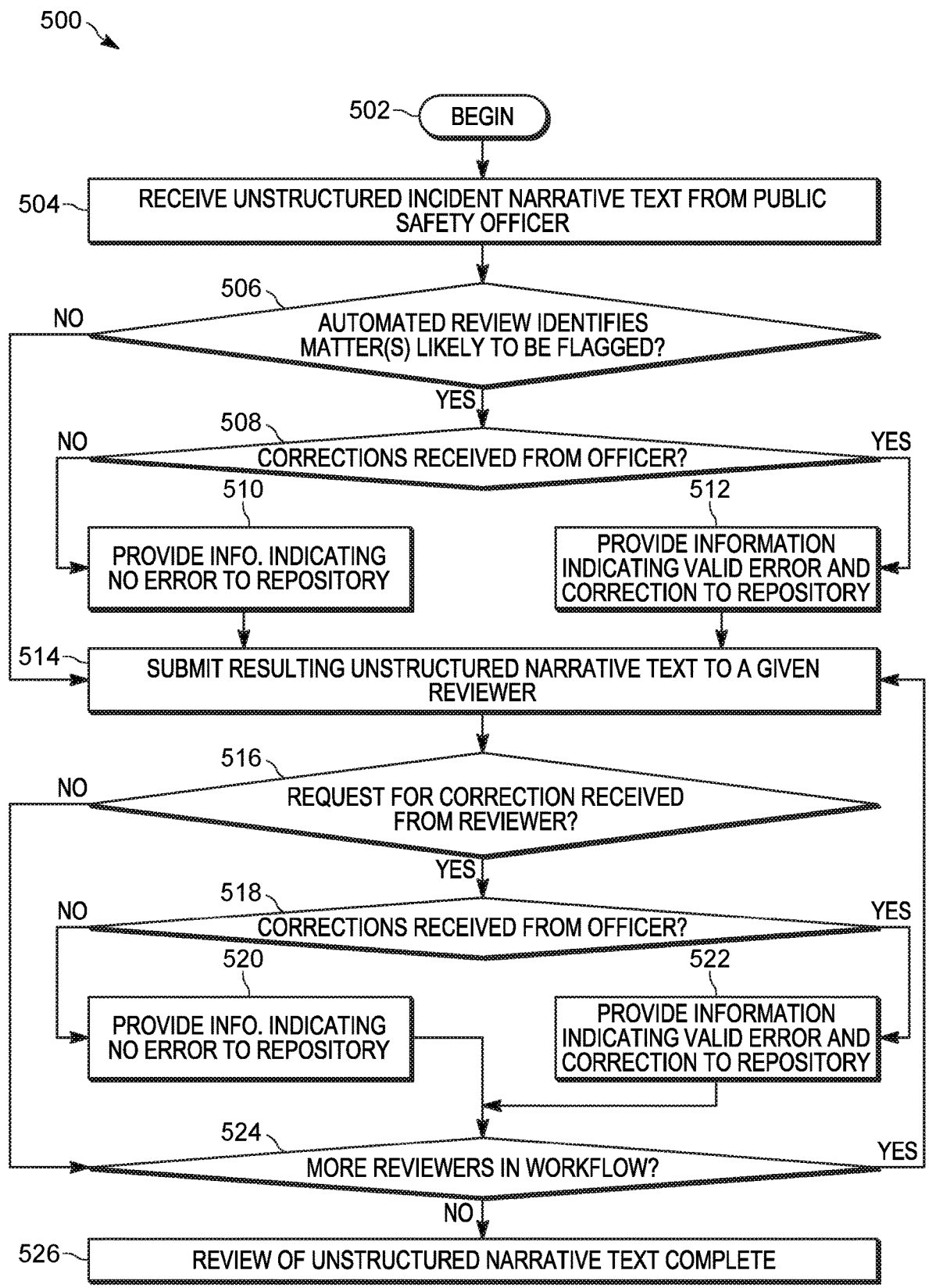
FIG. 5 is a flowchart illustrating selected elements of an example process for public safety incident reporting including automated review of public safety incident reports, in accordance with some embodiments.

FIG. 5 is a flowchart illustrating selected elements of an example process 500 for public safety incident reporting including automated review of public safety incident reports, in accordance with some embodiments. In at least some embodiments, some or all of the operations shown in FIG. 5 may be performed by an automated public safety incident report review system, such as automated public safety incident report review system 130 illustrated in FIG. 1. In at least some embodiments, the automated public safety incident report review system 130 may include a processor and a memory storing instructions that when executed by the processor cause the processor to perform one or more of the operations illustrated in FIG. 5. In other embodiments, automated public safety incident report review system 130 may include a hardware state machine or other electronic circuitry configured to perform one or more of the operations illustrated in FIG. 5. While a particular order of operations is indicated in FIG. 5 for illustrative purposes, the timing and ordering of such operations may vary where appropriate without negating the purpose and advantages of the examples set forth in detail throughout the remainder of this disclosure.

In this example embodiment, process 500 begins at block 502 in FIG. 5 and continues at block 504 with receiving unstructured incident narrative text from a public safety officer. For example, the unstructured incident narrative text may be received in response to the public safety officer initiating an automated review of the unstructured incident narrative text while drafting a public safety incident report or submitting a draft public incident report including the unstructured incident narrative text for review.

If, at 506, the automated review of the unstructured incident narrative text identifies one or more matters likely to be flagged for correction during a subsequent review process workflow, process 500 continues at 508. Otherwise, the process proceeds to 514. If, at 508, corrections to address the identified matters are received from the public safety officer, process 500 continues at 512.

At 512, process 500 includes providing information to a model and training repository indicating that an identified matter represents a valid error and including the corrections received from the public safety officer.

If, at 508, no corrections are received from the public safety officer, process 500 continues at 510. For example, the public safety officer may determine that the identified matters do not require correction. In another example, the public safety officer may not have information available to correct or otherwise address the identified matters.

At 510, the process includes providing information to the model and training repository indicating that the identified matters do not represent valid errors or that the identified matters cannot be corrected at this time.

At 514, process 500 includes submitting the resulting unstructured incident narrative text, whether corrected or not, to a given reviewer in the review process workflow. For example, the resulting unstructured incident narrative text may be passed to a supervisor of the public safety officer, a records clerk, or another human reviewer in the review process workflow within the public safety incident report.

If, at 516, a request for correction is received from the given reviewer, process 500 continues at 518. Otherwise, the process proceeds to 524. If, at 518, corrections addressing the request for correction are received from the public safety officer, process 500 continues at 522.

At 522, the process includes providing information to the model and training repository indicating that the request for correction addresses a valid error and including the corrections received from the public safety officer.

If, at 518, no corrections are received from the public safety officer, process 500 continues at 520. For example, the public safety officer may determine that the request for correction is directed to an element of the unstructured incident narrative text that does not require correction. In another example, the public safety officer may not have information available to correct or otherwise address the request for correction.

At 520, the process includes providing information to the model and training repository indicating that the request for correction is directed to an element of the unstructured incident narrative text that does not require correction or correction is not possible at this time.

If, at 524, there are additional reviewers in the review workflow, process 500 returns to 514, after which any or all of the operations shown as 514 through 522 may be repeated, as appropriate, for each additional reviewer.

If there are no additional reviewers, or once the unstructured incident narrative text has been reviewed by all of the appropriate reviewers in the review process workflow, the review of the unstructured incident narrative text is complete, as in 526.

Figure 6:
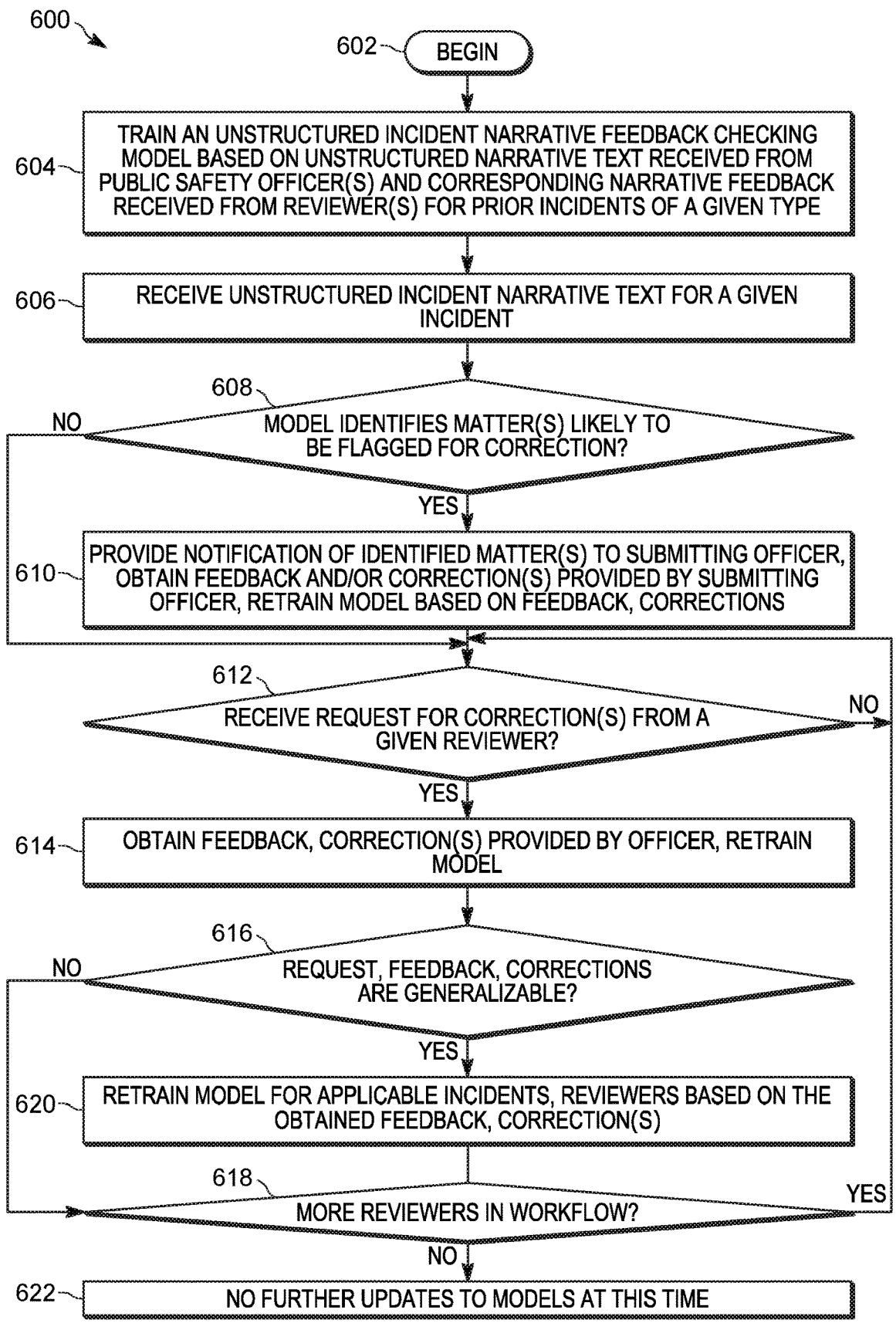
FIG. 6 is a flowchart illustrating selected elements of an example process for training and retraining an unstructured incident narrative feedback checking model, in accordance with some embodiments.

FIG. 6 is a flowchart illustrating selected elements of an example process 600 for training and retraining an unstructured incident narrative feedback checking model, in accordance with some embodiments. In at least some embodiments, some or all of the operations shown in FIG. 6 may be performed by an automated public safety incident report review system, such as automated public safety incident report review system 130 illustrated in FIG. 1. In at least some embodiments, the automated public safety incident report review system 130 may include a processor and a memory storing instructions that when executed by the processor cause the processor to perform one or more of the operations illustrated in FIG. 6. In other embodiments, automated public safety incident report review system 130 may include a hardware state machine or other electronic circuitry configured to perform one or more of the operations illustrated in FIG. 6. While a particular order of operations is indicated in FIG. 6 for illustrative purposes, the timing and ordering of such operations may vary where appropriate without negating the purpose and advantages of the examples set forth in detail throughout the remainder of this disclosure.

In this example embodiment, process 600 begins at block 602 in FIG. 6 and continues at block 604 with training an unstructured incident narrative feedback checking model based on unstructured incident narrative text received from one or more public safety officers and corresponding unstructured incident narrative feedback received from one or more reviewers for prior incidents of a given incident type.

At 606, process 600 includes receiving unstructured incident narrative text associated with a given public safety incident. For example, the unstructured incident narrative text may be received from a public safety officer within a draft public safety incident report.

If, at 608, the unstructured incident narrative feedback checking model identifies one or more matters likely to be flagged for correction during a subsequent review process workflow, process 600 continues at 610. Otherwise, the process continues at 612.

If, at 612, a request for one or more corrections is received from a given reviewer, process 600 continues at 614. Otherwise, the process continues at 618. At 614, method 600 includes obtaining feedback and any corrections provided by the public safety officer in response to the request for correction and retraining the unstructured incident narrative feedback checking model based on the obtained feedback and any corrections.

If at 616, it is determined that the request for correction, the obtained feedback and any corrections provided by the public safety officer are generalizable, process 600 continues at 620. Otherwise, the process continues at 618. For example, if similar requests for correction and corresponding responses or corrections are found to be common across different public safety incidents of the same incident type or multiple incident types or across public safety incident reports reviewed by the same reviewer or multiple reviewers, the request for correction, the obtained feedback and any corrections provided by the public safety officer may be generalizable to different incidents or incident types, or to public safety incident reports reviewed by different reviewers.

At 620, the process includes retraining the unstructured incident narrative feedback checking model and any other unstructured incident narrative feedback checking models applicable to public safety incidents of particular incident types or to public safety incident reports likely to be reviewed by particular reviewers based on the obtained feedback and any corrections.

If, at 618, there are additional reviewers in the review workflow, process 600 returns to 612, after which any or all of the operations shown as 612 through 620 may be repeated, as appropriate, for each additional reviewer. If there are no additional reviewers, or once the unstructured incident narrative text has been reviewed by all of the appropriate reviewers, no further updates may be made to the unstructured incident narrative feedback checking models at this time, as in 622.

Figure 7:
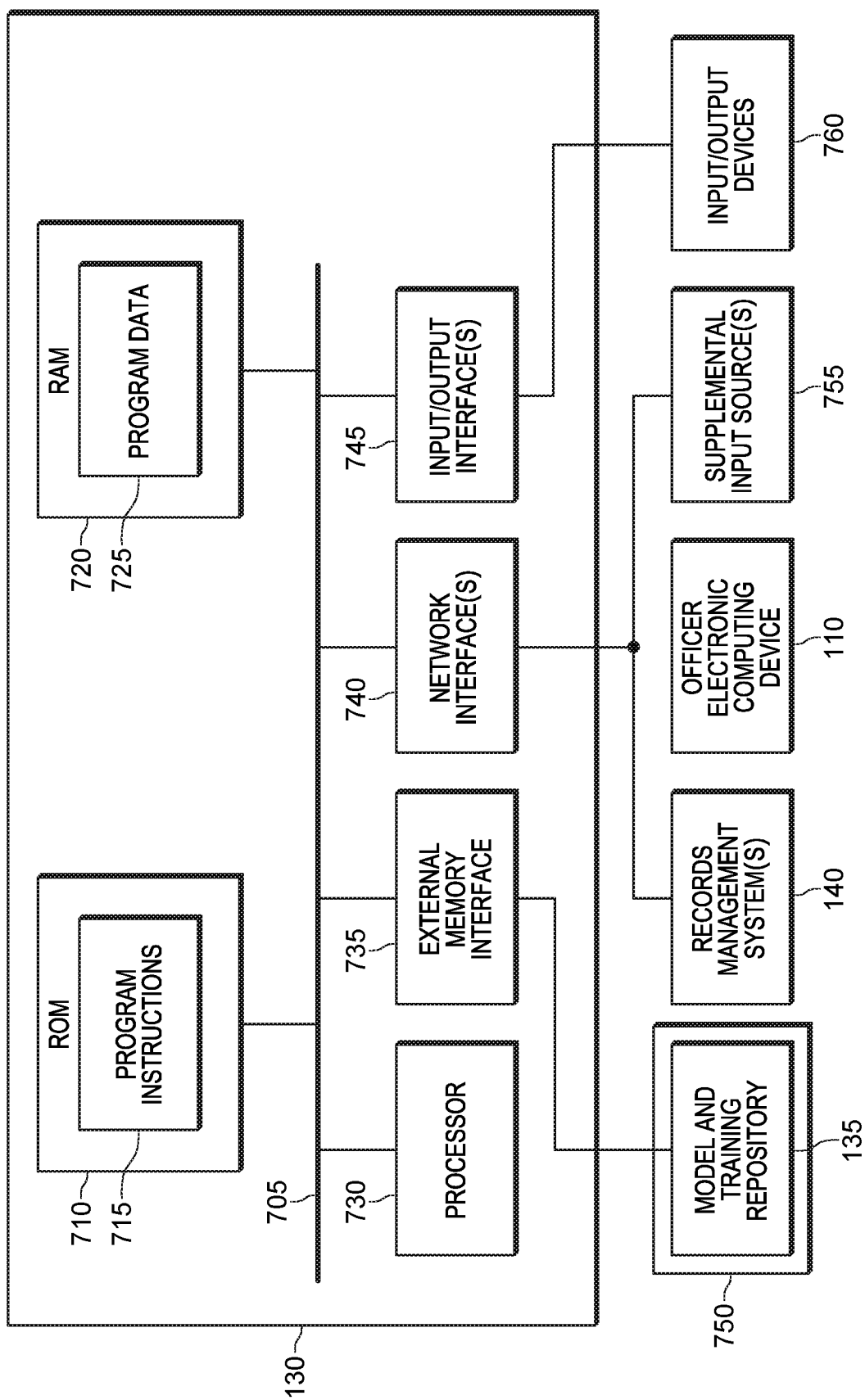
FIG. 7 is a block diagram illustrating selected elements of an example automated public safety incident report review system, in accordance with some embodiments.

FIG. 7 is a block diagram illustrating selected elements of an example automated public safety incident report review system 700, in accordance with some embodiments. In various embodiments, automated public safety incident report review system 700 may be similar to automated public safety incident report review system 130 illustrated in FIG. 1 and described herein. In the illustrated example, automated public safety incident report review system 700 includes a Read Only Memory (ROM) 710, a Random Access Memory (RAM) 720, one or more electronic processors 730, one or more input/output device interfaces 745 for communicating with locally attached devices and components, an external memory interface 735 through which automated public safety incident report review system 700 may be coupled to an external memory 750, and one or more network interfaces 740, all of which are coupled to a system bus 705 through which they communicate with each other. The external memory may include a model and training repository 135. External memory 750 may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, an electronic processor 730 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 710 stores program instructions 715, at least some of which may be executed by the electronic processor 730 to perform one or more of the processes, or portions thereof, described herein. For example, in various embodiments, at least some of the operations of process 200 illustrated in FIG. 2, process 500 illustrated in FIG. 5, and/or process 600 illustrated in FIG. 6, as described above, may be performed by, or in conjunction with, program instructions 715 executing on an electronic processor 730 of the automated public safety incident report review system 700.

In some embodiments, program instructions 715 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 715 may include program instructions that when executed by electronic processor 730 implement other functionality features of automated public safety incident report review system 700.

In this example embodiment, RAM 720 may, from time to time, store program data 725 including, without limitation, data representing public safety incident reports, structured incident data, unstructured incident narrative text received from a public safety officer, unstructured incident narrative feedback checking models, unstructured incident narrative feedback provided by automated public safety incident report review system 700 using various unstructured incident narrative feedback checking models, requests for correction received from various reviewers, unstructured incident narrative text revised by a public safety officer in response to unstructured incident narrative feedback provided by automated public safety incident report review system 700 or requests for correction received from various reviewers, definitions of various review process workflows including lists of reviewers and the order of their reviews, other data associated with public safety incident reports for public safety incidents of particular types, and/or other data accessible by program instruction 715 and used in performing the processes described herein. In some embodiments, any or all of this information may be stored in a programmable non-volatile memory, such as in external memory 750. In some embodiments, an external memory 750 may, at certain times, store one or more public safety databases or data retrieved from one or more public safety databases (not shown in FIG. 7). In some embodiments, automated public safety incident report review system 700 may access one or more public safety records management systems 140 through a network interface 740. In some embodiments, automated public safety incident report review system 700 may receive inputs from or provide feedback to an officer electronic computing device 110 through a network interface 740. In addition, automated public safety incident report review system 700 may receive inputs from one or more supplemental input sources 755, such as a body worn camera, an in-car camera, a surveillance camera, or another type of image capture device or audio capture device through a network interface 740. In various embodiments, supplemental inputs associated with a particular public safety incident, such as an audio recording, video footage, a transcription of an audio recording or video footage, or an additional public safety officer statement may be received directly from the supplemental input source 755 or from a public safety records management system 140 in which it was attached to or associated with a public safety incident report for the particular public safety incident. In some embodiments, RAM 720 may, from time to time, store local copies of all or a portion of program instructions 715 or other program instructions copied from ROM 710 and/or copied from external memory 750 over external memory interface 735.

In this example embodiment, input/output device interfaces 745 may include one or more analog input interfaces, such as one or more analog-to-digital (A/D) convertors, or digital interfaces for receiving signals or data from, and sending signals or data to, one or more input/output devices 760.

In various embodiments, input/output device interfaces 745 may operate to allow automated public safety incident report review system 700 to receive user input from and to provide data and instructions to a user of automated public safety incident report review system 700, such as an administrator of a public safety incident reporting system. User input may be provided, for example, via a keyboard or keypad, soft keys, icons, or soft buttons on a touch screen of a display, a scroll ball, a mouse, buttons, a microphone and the like (not shown in FIG. 7). In some embodiments, input/output device interfaces 745 may include a graphical user interface (GUI) generated, for example, by electronic processor 730 from program instructions 715 and program data 725 and presented on a display, enabling a user to interact with the display. Input/output device interfaces 745 may also include other input mechanisms, which for brevity are not described herein and which may be implemented in hardware, software, or a combination of both.

Any or all input/output devices 760 may be configured to send data to or receive data from automated public safety incident report review system 700 over one or more data lines through input/output interfaces 745, in various embodiments. Similarly, any or all input/output devices 760 may be configured to assert or receive a control signal from automated public safety incident report review system 700 over one or more connections through input/output interfaces 745. In response to receiving various inputs from input/output devices 760, the electronic processor 730 of automated public safety incident report review system 700 may execute program instructions to perform an automated review of a public safety incident report or unstructured incident narrative text thereof, as described herein.

Automated public safety incident report review system 700 may support one or more types of communication including, but not limited to, audio communication and data communication, using one or more types of transmission including, but not limited to, standing wave radio transmission or transmission over a communications network, such as a fourth-generation broadband wireless technology (4G) network, a land mobile radio (LMR) network, a long-term evolution wireless technology (LTE) network, a Wi-Fi network, a fifth-generation broadband wireless technology (5G) network (including a network architecture compliant with, for example, the 3GPP TS 23 specification series and a new radio (NR) air interface compliant with the 3GPP TS 38 specification series), or any other suitable communications network. In some embodiments that are deployed by public safety organizations, communications for mission critical operations may include, but are not limited to, communications over a high-powered land mobile radio network or a public safety long-term evolution (PS LTE) network. In some embodiments, an analog audio signal may be received and converted to a digital audio signal and processed by one or more components of automated public safety incident report review system 700, including but not limited to an analog-to-digital converter (ADC) and a digital signal processor (DSP). For example, electronic processor 730 may include digital signal processing functionality. In some embodiments, circuitry within automated public safety incident report review system 700, such as an ADC or a DSP, may be configured to apply one or more signal processing techniques to a received audio signal in order to perform speech recognition for transcribing an audio recording or for audio extracted from video footage.

Each network interface 740 may be a suitable system or device operable to serve as an interface between electronic processor 730 and a network. In some embodiments, a network interface 740 may enable automated public safety incident report review system 700 to communicate with a server or a remote device over a network using a suitable transmission protocol and/or standard, including, but not limited to, transmission protocols and/or standards enumerated below with respect to the discussion of the network. For example, automated public safety incident report review system 700 may communicate with one or more public safety records management systems 140, officer electronic computing devices 110 or one or more supplemental input sources 755 over respective network interfaces 740. In some embodiments, other server systems, client systems, or remote devices not shown in FIG. 7 including, but not limited to, various reviewer electronic computing devices, may communicate directly with automated public safety incident report review system 700 via a network interface 740 rather than through a public safety records management system 140.

In some embodiments, a network interface 740 may be communicatively coupled via a network to a network storage resource (not shown in FIG. 7). The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof. Each network interface 740 may enable wired and/or wireless communications to and/or from automated public safety incident report review system 700 or other elements of a public safety communication system. In various embodiments, an automated public safety incident report review system 130 may include more, fewer, or different elements than those of automated public safety incident report review system 700 illustrated in FIG. 7.

In some embodiments, a public safety records management system 140 may include elements similar to the elements of automated public safety incident report review system 700 illustrated in FIG. 7. For example, a public safety records management system 140 may include any or all of a ROM 710, a RAM 720 storing program data 725, an electronic processor 730, an external memory interface 735, one or more network interfaces 740, and one or more input/output interfaces 745, among other elements. In one such embodiment, ROM 710 stores program instructions 715, at least some of which may be executed by the electronic processor 730 to implement various functionality features of public safety records management system 140.

Similarly, in some embodiments, an officer electronic computing device 110 or a reviewer electronic computing device 120 may include any or all of a ROM 710 storing program instructions 715 for implementing functionality features of the electronic computing device 110 or reviewer electronic computing device 120, a RAM 720 storing program data 725, an electronic processor 730, an external memory interface 735, a network interface 740, and one or more input/output interfaces 745, among other elements.

In various embodiments, the public safety incident reporting systems described herein may perform automated reviews of unstructured incident text narratives in public safety incident reports based on structured incident data such as incident type and supplemental inputs such as audio recordings or video footage using machine-learning-based unstructured incident narrative feedback checking models. The automated review may identify omissions, discrepancies, or other matters within the unstructured incident narrative text likely to be flagged for correction by a subsequent human-based review process workflow and bring these matters to the attention of the submitting public safety officer for potential correction while the public safety incident is fresh in the mind of the public safety officer and prior to the public safety incident report being submitting to the human-based review process workflow. In at least some embodiments, the unstructured incident narrative feedback checking models may be specific to particular public safety incident types or to public safety incident reports likely to be reviewed by particular reviewers. The unstructured incident narrative feedback checking models may be trained using unstructured incident narrative text received from one or more public safety officers and corresponding unstructured incident narrative feedback received from one or more reviewers for prior incidents of particular incident types and may be retrained and refined for improved accuracy based on unstructured incident narrative text received from a submitting public safety officer for a given public safety incident report, unstructured incident narrative feedback received from the automated review or, subsequently, from various human reviewers, and feedback or corrections provided by the submitting public safety officer in response to the feedback received from the automated review or from various human reviewers.

The early identification of matters in the unstructured incident narrative text that are likely to be flagged by a human reviewer during the review process workflow may enable more accurate and complete public safety incident reporting while reducing the number and frequency of public safety incident reports rejected for common errors. In addition, the techniques described herein may reduce the workload of public safety officers and reviewers, as well as the time required for final acceptance of a public safety incident report, improve accuracy and completeness of electronic incident reports and leverage trained machine learning models to expedite electronic identification of errors and facilitate electronic correction thereof, saving additional electronic resources such as communications bandwidth, process power, and electronic storage required by prior electronic incident narrative workflow processes.

While specific examples of public safety incident reporting systems, and components thereof, and processes for performing automated reviews of unstructured incident text narratives in public safety incident reports are described herein, in other embodiments, the processes and devices described herein may be applied in public safety incident reporting systems including more, fewer, or different components and in which public safety officers and reviewers perform different tasks in order to create accurate and complete public safety incident reports using automated reviews of unstructured incident text narratives. In some embodiments, the techniques described herein for performing automated reviews of unstructured incident text narratives may be used in safety contexts beyond those involving public safety organizations such as, for example, in enterprise or private security environments where similar incident reporting may occur.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method for automated review of public safety incident reports, the method comprising:
    receiving, via a user input/output interface of an electronic computing device, structured incident data in one or more tagged text fields for a public safety incident report, the received structured incident data including incident type information identifying an incident type of a given public safety incident;
    receiving, via the user input/output interface, unstructured incident narrative text describing the given public safety incident;
    selecting, from among a plurality of available unstructured incident narrative feedback checking models, each of which is a machine learning model trained to analyze public safety incident reports for public safety incidents of one or more of a plurality of incident types, based at least on the identified incident type included in the received structured incident data, a first unstructured incident narrative feedback checking model;
    applying the selected first unstructured incident narrative feedback checking model to the received unstructured incident narrative text in light of:
        supplemental information included in the received structured incident data, the received structured incident data received in the one or more tagged text fields for the public safety incident report; or
        supplemental information associated with the given public safety incident and obtained from a source other than the received structured incident data, the received structured incident data received in the one or more tagged text fields for the public safety incident report;
    identifying, dependent on the application of the first unstructured incident narrative feedback checking model, one or more matters in the received unstructured incident narrative text that are likely to be flagged for correction during a subsequent review of the received unstructured incident narrative text or the public safety incident report;
    providing, to the user input/output interface, unstructured incident narrative feedback including a notification of the one or more matters identified in the received unstructured incident narrative text by the first unstructured incident narrative feedback checking model;
    submitting the received structured incident data and the received unstructured incident narrative text to a review process;
    receiving, from the review process, a request to correct one or more matters in the received unstructured incident narrative text that were flagged for correction by a reviewer;
    receiving, via the user input/output interface on behalf of a public safety officer who provided the received unstructured incident narrative text, a revised unstructured incident narrative text reflecting the addition of one or more elements in the received unstructured incident narrative text, the removal of one or more elements from the received unstructured incident narrative text, or the modification of one or more elements in the received unstructured incident narrative text responsive to the one or more matters in the received unstructured incident narrative text identified by the reviewer;
    determining that the request received from the review process applies to all public safety incidents of the identified incident type or is specific to the given public safety incident; and
    providing, in response to determining that the request received from the review process applies to all public safety incidents of the identified incident type, the received unstructured incident narrative text, the request received from the review process, and the revised unstructured incident narrative text to a training repository for subsequent re-training of the first unstructured incident narrative feedback checking model.

2. The method of claim 1, further comprising:
    receiving, via the user input/output interface on behalf of the public safety officer who provided the received unstructured incident narrative text, an indication that the one or more matters identified in the received unstructured incident narrative text by the first unstructured incident narrative feedback checking model do not require correction; and
    providing the received unstructured incident narrative text, the one or more matters identified in the received unstructured incident narrative text by the first unstructured incident narrative feedback checking model, and the indication that the one or more matters identified in the received unstructured incident narrative text by the first unstructured incident narrative feedback checking model do not require correction to the training repository for subsequent re-training of the first unstructured incident narrative feedback checking model.

3. An electronic computing device for automated review of public safety incident reports, comprising:
    a processor; and
    a memory storing program instructions that when executed by the processor are configured to:
        receive structured incident data in one or more tagged text fields for a public safety incident report, the received structured incident data including incident type information identifying an incident type of a given public safety incident;
        receive unstructured incident narrative text describing the given public safety incident;
        select, from among a plurality of stored unstructured incident narrative feedback checking models, each of which is a machine learning model trained to analyze public safety incident reports for public safety incidents of one or more of a plurality of incident types, based at least on the identified incident type included in the received structured incident data, a first unstructured incident narrative feedback checking model;

apply the selected first unstructured incident narrative feedback checking model to the received unstructured incident narrative text in light of:

supplemental information included in the received structured incident data, the received structured incident data received in the one or more tagged text fields for the public safety incident report; or supplemental information associated with the given public safety incident and obtained from a source other than the received structured incident data, the received structured incident data received in the one or more tagged text fields for the public safety incident report;

identify, dependent on the application of the first unstructured incident narrative feedback checking model, one or more matters in the received unstructured incident narrative text that are likely to be flagged for correction during a subsequent review of the received unstructured incident narrative text or the public safety incident report;

provide unstructured incident narrative feedback including a notification of the one or more matters identified in the received unstructured incident narrative text to a user input/output interface of another electronic computing device from which the unstructured incident narrative text was received;

submit the received structured incident data and the received unstructured incident narrative text to a review process;

receive, from the review process, a request to correct one or more matters in the received unstructured incident narrative text that were flagged for correction by a reviewer;

receive, on behalf of a public safety officer from whom the received unstructured incident narrative text was received, a revised unstructured incident narrative text reflecting the addition of one or more elements in the received unstructured incident narrative text, the removal of one or more elements from the received unstructured incident narrative text, or the modification of one or more elements in the received unstructured incident narrative text responsive to the one or more matters in the received unstructured incident narrative text identified by the reviewer;

determine whether the request received from the review process applies to all public safety incidents of the identified incident type or is specific to the given public safety incident; and provide, in response to a determination that the request received from the review process applies to all public safety incidents of the identified incident type, the received unstructured incident narrative text, the request received from the review process, and the revised unstructured incident narrative text to a training repository for subsequent re-training of the first unstructured incident narrative feedback checking model.

4. The electronic computing device of claim 3, wherein the received structured incident data further comprises one or more of location information describing a location of the given public safety incident or officer information identifying the public safety officer submitting the structured incident data.

5. The electronic computing device of claim 3, wherein the received unstructured incident narrative text describes one or more of a timeline associated with the given public safety incident or an interaction between two or more persons involved in the given public safety incident.

6. The electronic computing device of claim 3, wherein the supplemental information associated with the given public safety incident is obtained from an audio file associated with the given public safety incident, a video file associated with the given public safety incident, or a textural representation of audio or video data captured in association with the given public safety incident.

7. The electronic computing device of claim 3, wherein the one or more matters identified in the received unstructured incident narrative text by the first unstructured incident narrative feedback checking model comprise one or more omissions, inclusions, or conflicts in the received unstructured incident narrative text likely to be flagged for correction during a subsequent review of the received unstructured incident narrative text or the public safety incident report.

8. The electronic computing device of claim 3, wherein the plurality of incident types includes two or more of a traffic incident type, a robbery type, a burglary type, a trespass type, a resisting arrest type, an assault type, a battery type, or a homicide type.

9. The electronic computing device of claim 3, wherein each of the plurality of available unstructured incident narrative feedback checking models is trained to analyze public safety incident reports reviewed by a respective reviewer and the first unstructured incident narrative feedback checking model is trained to analyze public safety incident reports reviewed by a given reviewer likely to review the received unstructured incident narrative text or the public safety incident report.

10. The electronic computing device of claim 9, wherein the given reviewer is a supervisor of the public safety officer on whose behalf the received unstructured incident narrative text was received, a records clerk, a court clerk, or an officer of a court.

11. The electronic computing device of claim 3, wherein when executed by the processor, the program instructions are further configured to, prior to retrieving the first unstructured incident narrative feedback checking model, train each of the plurality of available unstructured incident narrative feedback checking models using one or more of:

unstructured incident narrative text received on behalf of one or more public safety officers and corresponding unstructured incident narrative feedback submitted by one or more reviewers in association with prior public safety incidents of the identified incident type; or unstructured incident narrative text received on behalf of one or more public safety officers and corresponding unstructured incident narrative feedback submitted by a given reviewer in association with a prior public safety incident of the identified incident type.

12. The electronic computing device of claim 3, wherein when executed by the processor, the program instructions are further configured to, prior to retrieving the first unstructured incident narrative feedback checking model, train each of the plurality of available unstructured incident narrative feedback checking models using one or more of:

unstructured incident narrative text received on behalf of one or more public safety officers and corresponding unstructured incident narrative feedback submitted by one or more reviewers in association with prior public safety incidents of multiple incident types; or unstructured incident narrative feedback submitted electronically by one or more reviewers in association with prior public safety incidents of multiple incident types.

13. The electronic computing device of claim 3, wherein when executed by the processor, the program instructions are further configured to:
submit the public safety incident report including the revised unstructured incident narrative text for review.

14. The electronic computing device of claim 3, wherein when executed by the processor, the program instructions are further configured to:
receive, on behalf of the public safety officer from whom the received unstructured incident narrative text was received, an indication that the one or more matters identified in the received unstructured incident narrative text by the first unstructured incident narrative feedback checking model do not require correction; and
provide the received unstructured incident narrative text, the one or more matters identified in the received unstructured incident narrative text by the first unstructured incident narrative feedback checking model, and the indication that the one or more matters identified in the received unstructured incident narrative text by the first unstructured incident narrative feedback checking model do not require correction to the training repository for subsequent re-training of the first unstructured incident narrative feedback checking model.

15. The electronic computing device of claim 3, wherein when executed by the processor, the program instructions are further configured to:
identify one or more potential resolutions to the one or more matters identified in the received unstructured incident narrative text by the first unstructured incident narrative feedback checking model that meet a minimum confidence level threshold; and
provide, to the user input/output interface, the identified one or more potential resolutions.

16. The electronic computing device of claim 15, wherein when executed by the processor, the program instructions are further configured to:
receive a selection of one of the identified one or more potential resolutions; and
provide the one or more matters identified in the received unstructured incident narrative text by the first unstructured incident narrative feedback checking model, and the selected one of the identified one or more potential resolutions to the training repository for subsequent re-training of the first unstructured incident narrative feedback checking model.

17. A non-transitory, computer-readable storage medium having program instructions stored thereon that when executed by an electronic processor cause the electronic processor to perform:
receiving, via a user input/output interface of an electronic computing device, structured incident data in one or more tagged text fields for a public safety incident report including incident type information identifying an incident type of a given public safety incident;
receiving, via the user input/output interface, unstructured incident narrative text describing the given public safety incident;
selecting, from among a plurality of available unstructured incident narrative feedback checking models, each of which is a machine learning model trained to analyze public safety incident reports for public safety incidents of one or more of a plurality of incident types, based at least on the identified incident type, a first unstructured incident narrative feedback checking model;
applying the selected first unstructured incident narrative feedback checking model to the received unstructured incident narrative text in light of supplemental information included in the received structured incident data, the received structured incident data received in the one or more tagged text fields for the public safety incident report, or supplemental information associated with the given public safety incident and obtained from a source other than the received structured incident data, the received structured incident data received in the one or more tagged text fields for the public safety incident report;
identifying, dependent on the application of the first unstructured incident narrative feedback checking model, one or more matters in the received unstructured incident narrative text that are likely to be flagged for correction during a subsequent review of the received unstructured incident narrative text or the public safety incident report;
providing, to the user input/output interface, unstructured incident narrative feedback including a notification of the one or more matters identified in the received unstructured incident narrative text by the first unstructured incident narrative feedback checking model;
submitting the received structured incident data and the received unstructured incident narrative text to a review process;
receiving, from the review process, a request to correct one or more matters in the received unstructured incident narrative text that were flagged for correction by a reviewer;
receiving, via the user input/output interface on behalf of a public safety officer who provided the received unstructured incident narrative text, a revised unstructured incident narrative text reflecting the addition of one or more elements in the received unstructured incident narrative text, the removal of one or more elements from the received unstructured incident narrative text, or the modification of one or more elements in the received unstructured incident narrative text responsive to the one or more matters in the received unstructured incident narrative text identified by the reviewer;
determining that the request received from the review process applies to all public safety incidents of the identified incident type or is specific to the given public safety incident; and
providing, in response to determining that the request received from the review process applies to all public safety incidents of the identified incident type, the received unstructured incident narrative text, the request received from the review process, and the revised unstructured incident narrative text to a training repository for subsequent re-training of the first unstructured incident narrative feedback checking model.

* * * * *